United States Patent
Sherman et al.

(10) Patent No.: US 9,236,832 B2
(45) Date of Patent: Jan. 12, 2016

(54) INTERCONNECTING STRIPS FOR BUILDING INTEGRABLE PHOTOVOLTAIC MODULES

(75) Inventors: Adam C. Sherman, Newark, CA (US); Michael Meyers, San Jose, CA (US); Jason Corneille, San Jose, CA (US)

(73) Assignee: Apollo Precision (Fujian) Limited, Quanzhou, Fujian Province (CN)

( * ) Notice: Subject to any disclaimer, the term of this patent is extended or adjusted under 35 U.S.C. 154(b) by 936 days.

(21) Appl. No.: 13/277,509

(22) Filed: Oct. 20, 2011

(65) Prior Publication Data
US 2013/0098420 A1  Apr. 25, 2013

(51) Int. Cl.
| H01R 11/00 | (2006.01) |
| H02S 40/34 | (2014.01) |
| H02S 20/23 | (2014.01) |
| H01R 13/187 | (2006.01) |
| H01R 13/52 | (2006.01) |

(52) U.S. Cl.
CPC ............... H02S 40/34 (2014.12); H02S 20/23 (2014.12); *H01R 13/187* (2013.01); *H01R 13/5219* (2013.01); *Y02B 10/12* (2013.01); *Y10T 29/49355* (2015.01)

(58) Field of Classification Search
CPC ....... H02S 40/34; H02S 20/23; H01R 13/187; H01R 13/5219; Y10T 29/49355; Y02B 10/12
USPC ......... 439/500, 502, 627, 660, 709, 875, 883; 136/244, 245, 256
See application file for complete search history.

(56) References Cited

U.S. PATENT DOCUMENTS

| 8,779,279 B2 * | 7/2014 | Nakamura | .......... H01L 31/0504 136/244 |
| 9,112,080 B1 * | 8/2015 | Corneille | ............ H01L 31/0465 1/1 |
| 2008/0053511 A1 * | 3/2008 | Nakamura | .......... H01L 31/0504 136/244 |

* cited by examiner

*Primary Examiner* — Khiem Nguyen
(74) *Attorney, Agent, or Firm* — Weaver Austin Villeneuve & Sampson LLP

(57) ABSTRACT

Provided are novel interconnecting strips for electrically connecting building integrable photovoltaic (BIPV) modules in a photovoltaic array. An interconnecting strip can be provided between a building structure and the BIPV modules, with electrical connections established by lowering the modules onto the strip previously positioned on the structure. The strip can includes two or more terminal groups aligned with different rows of BIPV modules. Each terminal group includes two or more connector terminals for connecting to the modules in that row. The interconnecting strip also includes leads extending between terminal groups and connecting connector terminals of different groups. In certain embodiments, terminal groups are offset with respect to adjacent groups to align with BIPV modules that are similarly offset to provide a moisture barrier. The interconnecting strip may be reconfigured in the field to provide different electrical connection schemes among BIPV modules.

10 Claims, 17 Drawing Sheets

INTERCONNECTING STRIPS FOR BUILDING INTEGRABLE PHOTOVOLTAIC MODULES

BACKGROUND

Photovoltaic cells are widely used for electricity generation, with one or more photovoltaic cells typically sealed within in a module. Multiple modules may be arranged into photovoltaic arrays used to convert solar energy into electricity by the photovoltaic effect. Arrays can be installed on building rooftops and are used to provide electricity to the buildings and to the general electrical grid. Photovoltaic modules in such arrays often need to be interconnected across multiple rows.

SUMMARY

Provided are novel interconnecting strips for electrically connecting building integrable photovoltaic (BIPV) modules in a photovoltaic array. An interconnecting strip can be provided on a building structure, with electrical connections established by lowering the modules onto the strip during array installation. The strip can include two or more terminal groups, each of which can be aligned with a different row of BIPV modules. Each terminal group can include two or more connector terminals for connecting to the modules in that row. The interconnecting strip can also include leads that connect terminals of different terminal groups. In certain embodiments, terminal groups are offset with respect to adjacent groups to align with BIPV modules that are similarly offset. The interconnecting strip may be reconfigured in the field to provide different electrical connection schemes among BIPV modules.

In certain embodiments, an interconnecting strip for providing electrical connections between BIPV modules arranged in multiple rows includes a base sheet having an insulating material and two or more terminal groups attached to the base sheet and separated by a predetermined distance from each other along a length of the base sheet. Each terminal group may be aligned with a different row of BIPV modules. Furthermore, each terminal group may include at least four connector terminals for connecting to electrical connectors of two adjacent BIPV modules provided in that row. The interconnecting strip may also include two or more connecting leads extending along a length of the base sheet and electrically connected to connector terminals of the two or more terminal groups. In certain embodiments, at least four connector terminals include sockets extending substantially perpendicular to the base sheet. The predetermined distance which separates each pair of adjacent terminal groups may correspond to a width of exposed portions of the BIPV modules.

In certain embodiments, two adjacent terminal groups are offset with respect to each other in a direction along a width of the base sheet. At least one terminal group may include a jumper interconnecting two of the at least four connector terminals. In certain embodiments, all terminal groups of the interconnecting strip may include jumpers interconnecting two of the at least four connector terminals in each terminal group. One or more terminal groups may include integrated switches for changing electrical connections among the at least four connector terminals in the one or more terminal groups. In certain embodiments, one or more terminal groups include at least six connector terminals in the one or more terminal groups. A terminal group may include eight connector terminals, where four connector terminals are configured for connecting to electrical connectors of two adjacent BIPV modules in the same row and two different connector terminals connected to corresponding two connector terminals in a first terminal group positioned adjacent to the one terminal group. The two remaining connector terminals are connected to corresponding two connector terminals in a second terminal group positioned adjacent to the one terminal group and on another side of the one terminal group along of the length of the base sheet with respect to the first terminal group. In certain embodiments, an interconnecting strip includes a first set of two connector terminals for connecting to electrical connectors of a first BIPV module and a second set of two connector terminals for connecting to electrical connectors of a second BIPV module positioned in the same row with the first BIPV module. The first set of two connector terminals is movable with respect to the second set of two connector terminals at least in a direction along the width of the base sheet.

In certain embodiments, a photovoltaic string includes a first row comprising a first BIPV module and a second BIPV module such that the first BIPV module is not directly connected to the second BIPV module. The photovoltaic string may also include a second row comprising a third BIPV module and an interconnecting strip having a first terminal group aligned with the first row and comprising a first set of connector terminals and a second set of connector terminals. The first set of connector terminals electrically connected to the first BIPV module, while the second set of connector terminals electrically connected to the second BIPV module. The interconnecting strip also includes a second terminal group aligned with the second row and having a third set of connector terminals. The third set of connector terminals is electrically connected to the third BIPV and to the first set of connector terminals. In certain embodiments, at least one connector terminal in the first set is connected to at least another connector terminal in the second set. In the same or other embodiments, the photovoltaic string includes a fourth BIPV module positioned in the second row and not directly connected to the third BIPV module. The interconnecting strip may include a fourth set of connector terminals provided in the second terminal group and attached to the fourth BIPV module and to the second set of connector terminals. In certain embodiments, a photovoltaic string includes a fourth set of connector terminals provided in the second terminal group and attached to the second set of connector terminal such that at least two connector terminals in the fourth terminal group are interconnected.

Provided also is a method of forming a photovoltaic string on a building structure. The method may involve positioning an interconnecting strip on the building structure. The interconnecting strip may include a first terminal group and a second terminal group such that both terminal groups are attached to a base sheet and separated by a predetermined distance from each other along the length of the base sheet. Each terminal group includes at least four connector terminals such that at least two connector terminals in each terminal group are electrically connected to corresponding terminals in one or more adjacent terminal groups. The method may proceed with lowering a first BIPV module onto the interconnecting strip. The first BIPV module may include two contact points on a back side of the first BIPV module. Lowering the first BIPV module onto the interconnecting strip establishes electrical connections between the two contact points of the first BIPV module and two corresponding connector terminals of the first terminal group. In certain embodiments, prior to lowering the first BIPV module onto the interconnecting strip, the method may involve configuring switches of one or more terminal groups to provide a predetermined connection scheme between connector terminals of the interconnecting strip.

In certain embodiments, the method may proceed with lowering a second BIPV module onto the interconnecting strip. The second BIPV module includes two contact points on a back side of the second BIPV module such that lowering this BIPV module onto the interconnecting strip establishes electrical connections between the two contact points of the module and two corresponding connector terminals of the first terminal group. The two corresponding connector terminals of the first terminal group connected to the first BIPV module are different from the two corresponding connector terminals of the first terminal group connected to the second BIPV module. In other embodiments, the method may proceed with lowering a second BIPV module onto the interconnecting strip. The second BIPV module includes two contact points on a back side of the second BIPV module such that lowering the second BIPV module onto the interconnecting strip establishes electrical connections between the two contact points of that module and two corresponding connector terminals of the second terminal group. In certain embodiments, the electrical connections between the two contact points of the second BIPV module and the two corresponding connector terminals of the second terminal group are provided by an extending strip. The extending strip may be attached to the interconnecting strip after positioning the interconnecting strip on the building structure.

These and other embodiments are described further below with reference to the figures.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

BIPV modules are installed on building structures to provide electrical power and protect the underlying building structures from the environment. BIPV modules can be interconnected in strings, which often include multiple rows of modules. Variations in installation area shapes and obstructions may present additional challenges for interconnecting modules, drive up installation costs (or, more specifically, interconnection costs), and may result in a lower utilization of the available installation area. For example, some rows may need to have different lengths than others. Careful planning of various connections and positions of BIPV modules may be difficult to perform in field conditions. At the same time, information about various aspects of the installation is generally not available in advance.

One factor that presents particular difficulties during the planning and installation of a photovoltaic array is establishing electrical connections across multiple rows of modules that have different lengths. When rows have the same length, end modules may be easily interconnected using various features, such as edge pieces. Such features usually allow for a certain predetermined offset between two rows of equal length but cannot be used when the ends of two adjacent rows are offset by more than this predetermined amount (e.g., when one row is shorter than another). If an array is limited to multiple rows having the same length, then much of the installation area may become unused. Furthermore, a photovoltaic array has a better aesthetic appearance when it conforms to the installation boundary and has a constant offset between the rows of its modules. Additional requirements to the installation and interconnection boundaries may be prescribed by local fire and electrical codes. All of these factors further complicate arranging the BIPV modules and establishing electrical connections among the modules, as described below with reference to FIG. 9A.

Figure 1:
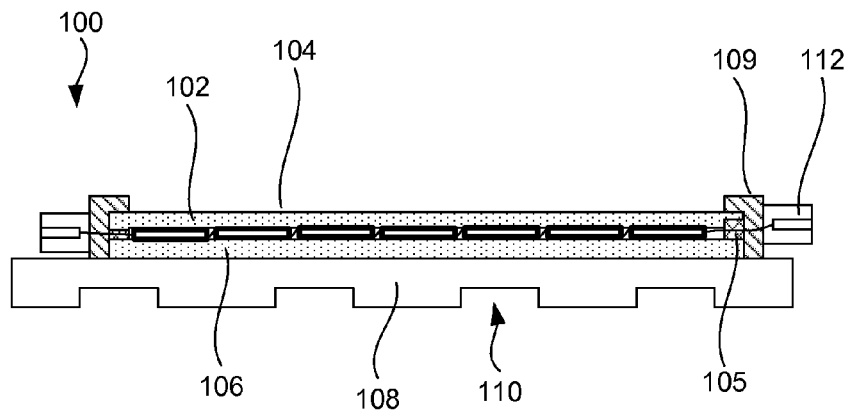
FIG. 1 is a schematic cross-sectional side view of a BIPV module, in accordance with certain embodiments.

To provide a better understanding of various features of BIPV modules and methods of integrating connectors with photovoltaic inserts during module fabrication, some examples of BIPV modules will now be briefly described. FIG. 1 is a schematic cross-sectional end view (line 1-1 in FIG. 2 indicates the position of this cross-section) of a BIPV module 100, in accordance with certain embodiments. BIPV module 100 may have one or more photovoltaic cells 102 that are electrically interconnected. Photovoltaic cells 102 may be interconnected in parallel, in series, or in various combinations of these. Examples of photovoltaic cells include copper indium gallium selenide (CIGS) cells, cadmium-telluride (Cd—Te) cells, amorphous silicon (a-Si) cells, micro-crystalline silicon cells, crystalline silicon (c-Si) cells, gallium arsenide multi junction cells, light adsorbing dye cells, organic polymer cells, and other types of photovoltaic cells.

Photovoltaic cell 102 has a photovoltaic layer that generates a voltage when exposed to sunlight. In certain embodiments, the photovoltaic layer includes a semiconductor junction. The photovoltaic layer may be positioned adjacent to a back conductive layer, which, in certain embodiments, is a thin layer of molybdenum, niobium, copper, and/or silver. Photovoltaic cell 102 may also include a conductive substrate, such as stainless steel foil, titanium foil, copper foil, aluminum foil, or beryllium foil. Another example includes a conductive oxide or metallic deposition over a polymer film, such as polyimide. In certain embodiments, a substrate has a thickness of between about 2 mils and 50 mils (e.g., about 10 mils), with other thicknesses also in the scope. Photovoltaic cell 102 may also include a top conductive layer. This layer typically includes one or more transparent conductive oxides (TCO), such as zinc oxide, aluminum-doped zinc oxide (AZO), indium tin oxide (ITO), and gallium doped zinc oxide. A typical thickness of a top conductive layer is between about 100 nanometers to 1,000 nanometers (for example, between about 200 nanometers and 800 nanometers), with other thicknesses within the scope.

In certain embodiments, photovoltaic cells 102 are interconnected using one or more current collectors (not shown). The current collector may be attached and configured to collect electrical currents from the top conductive layer. The current collector may also provide electrical connections to adjacent cells as further described with reference to of FIG. 5, below. The current collector includes a conductive component (e.g., an electrical trace or wire) that contacts the top conductive layer (e.g., a TCO layer). The current collector may further include a top carrier film and/or a bottom carrier film, which may be made from transparent insulating materials to prevent electrical shorts with other elements of the cell and/or module. In certain embodiments, a bus bar is attached directly to the substrate of a photovoltaic cell. A bus bar may also be attached directly to the conductive component of the current collector. For example, a set of photovoltaic cells may be electrically interconnected in series with multiple current collectors (or other interconnecting wires). One bus bar may be connected to a substrate of a cell at one end of this set, while another bus bar may be connected to a current collector at another end.

Photovoltaic cells 102 may be electrically and environmentally insulated between a front sheet 104 (i.e., the light incident sheet) and a back sheet 106 (i.e., the building structure facing sheet), which may be referred to as sealing sheets. Examples of such sheets include glass, polyethylene, polyethylene terephthalate (PET), polypropylene, polybutylene, polybutylene terephthalate (PBT), polyphenylene oxide (PPO), polyphenylene sulfide (PPS) polystyrene, polycarbonates (PC), ethylene-vinyl acetate (EVA), fluoropolymers (e.g., polyvinyl fluoride (PVF), polyvinylidene fluoride (PVDF), ethylene-terafluoethylene (ETFE), fluorinated ethylene-propylene (FEP), perfluoroalkoxy (PFA) and polychlorotrifluoroethane (PCTFE)), acrylics (e.g., poly(methyl methacrylate)), silicones (e.g., silicone polyesters), and/or polyvinyl chloride (PVC), as well as multilayer laminates and co-extrusions of these materials. A typical thickness of a sealing sheet is between about 5 mils and 100 mils or, more specifically, between about 10 mils and 50 mils. In certain embodiments, a back sheet includes a metallized layer to improve water permeability characteristics of the sheet. For example, a metal foil may be positioned in between two insulating layers to form a composite back sheet. In certain embodiments, a module has an encapsulant layer positioned between one or both sheets 104, 106 and photovoltaic cells 102. Examples of encapsulant layer materials include non-olefin thermoplastic polymers or thermal polymer olefin (TPO), such as polyethylene (e.g., a linear low density polyethylene), polypropylene, polybutylene, polyethylene terephthalate (PET), polybutylene terephthalate (PBT), polystyrene, polycarbonates, fluoropolymers, acrylics, ionomers, silicones, and combinations thereof.

BIPV module 100 may also include an edge seal 105 that surrounds photovoltaic cells 102. Edge seal 105 may be used to secure front sheet 104 to back sheet 106 and/or to prevent moisture from penetrating in between these two sheets. Edge seal 105 may be made from certain organic or inorganic materials that have low inherent water vapor transmission rates (WVTR) (e.g., typically less than 1-2 $g/m^2/day$). In certain embodiments, edge seal 105 is configured to absorb moisture from inside the module in addition to preventing moisture ingression into the module. For example, a butyl-rubber containing moisture getter or desiccant may be added to edge seal 105. In certain embodiments, a portion of edge seal 105 that contacts electrical components (e.g., bus bars) of BIPV module 100 is made from a thermally resistant polymeric material. Various examples of thermally resistant materials and RTI ratings are further described below.

BIPV module 100 may also have a support sheet 108 attached to back sheet 106. The attachment may be provided by a support edge 109, which, in certain embodiments, is a part of support sheet 108. Support sheets may be made, for example, from rigid polymer materials such as polyethylene terephthalate (e.g., RYNITE® available from Du Pont in Wilmington, Del.), polybutylene terephthalate (e.g., CRASTIN® also available from Du Pont), polyphenylene sulfide (e.g., RYTON® available from Chevron Phillips in The Woodlands, Tex.), polyamide (e.g., ZYTEL® available from DuPont), polycarbonate, and polypropylene. In other embodiments, support sheet 108 may be attached to back sheet 106 without a separate support edge 109 or other separate supporting element. For example, support sheet 108 and back sheet 106 may be laminated together, or support sheet 108 may be formed (e.g., by injection molding) over back sheet 106. In other embodiments, back sheet 106 serves as a support sheet 108. In this case, the same element used to seal photovoltaic cells 102 may be positioned over and contact a roof structure (not shown). Support sheet 108 may have one or more ventilation channels 110 to allow for air to flow between BIPV module 100 and a building surface (e.g., a roof-deck or a water resistant underlayment/membrane on top of the roof deck). Ventilation channels 110 may be used for cooling BIPV module 100 during its operation. For example, it has been found that each 1° C. of heating from an optimal operating temperature of a typical Copper indium gallium (di)selenide CIGS cell causes an efficiency loss of about 0.33% to 0.5%.

Figure 2:
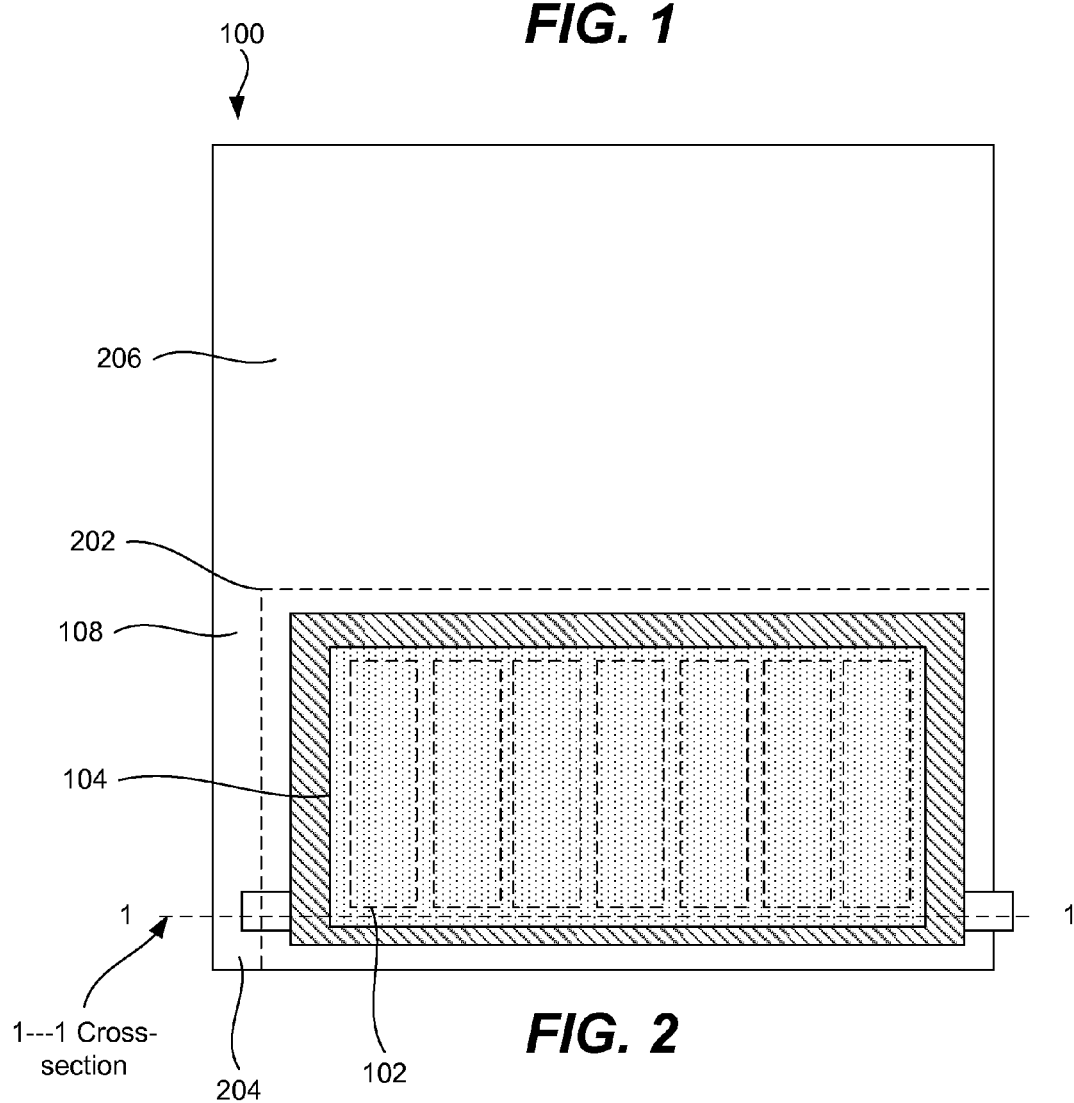
FIG. 2 is a schematic top view of a BIPV module, in accordance with certain embodiments.

BIPV module 100 has one or more electrical connectors 112 for electrically connecting BIPV module 100 to other BIPV modules and array components, such as an inverter and/or a battery pack. In certain embodiments, BIPV module 100 has two electrical connectors 112 positioned on opposite sides (e.g., the short or minor sides of a rectangular module) of BIPV module 100, as shown in FIGS. 1 and 2, for example. However, connectors may also be positioned on other sides as well (e.g., the long or major sides of a rectangular module). Connector position may depend on the overall arrangement of the module and/or installation and repair requirements. Each one of two electrical connectors 112 has at least one conductive element electrically connected to photovoltaic cells 102. In certain embodiments, electrical connectors 112 have additional conductive elements, which may or may not be directly connected to photovoltaic cells 102. For example, each of two electrical connectors 112 may have two conductive elements, one of which is electrically connected to photovoltaic cells 102, while the other is electrically connected to a bus bar (not shown) passing through BIPV module 100. This and other examples are described in more detail in the context of FIGS. 6 and 7. In general, regardless of the number of connectors 112 attached to BIPV module 100, at least two conductive elements of these connectors 112 are electrically connected to photovoltaic cells 102.

FIG. 2 is a schematic top view of BIPV module 100, in accordance with certain embodiments. Support sheet 108 is shown to have a side skirt 204 and a flap portion 206 extending beyond a photovoltaic portion 202 of BIPV module 100. Side skirt 204 is sometimes referred to as a side flap, while flap portion 206 is sometimes referred to as a top lap or a moisture flap. In certain embodiments, BIPV module 100 does not include side skirt 204. Photovoltaic portion 202 is defined as an area of BIPV module 100 that does not extend under other BIPV modules or similar building materials (e.g., roofing shingles) after installation. Photovoltaic portion 202 includes photovoltaic cells 102. Generally, it is desirable to maximize the ratio of the exposed area of photovoltaic cells 102 to photovoltaic portion 202 in order to maximize the "working area" of BIPV module 100. It should be noted that, after installation, flaps of other BIPV modules typically extend under photovoltaic portion 202. In a similar manner, after installation, side skirt 204 of BIPV module 100 may extend underneath another BIPV module positioned on the left (in the same row) of BIPV module 100, thereby creating an overlap for moisture sealing. Flap portion 206 may extend underneath one or more BIPV modules positioned above BIPV module 100. Arrangements of BIPV modules in an array will now be described in more detail with reference to FIGS. 3 and 4.

Figure 3:
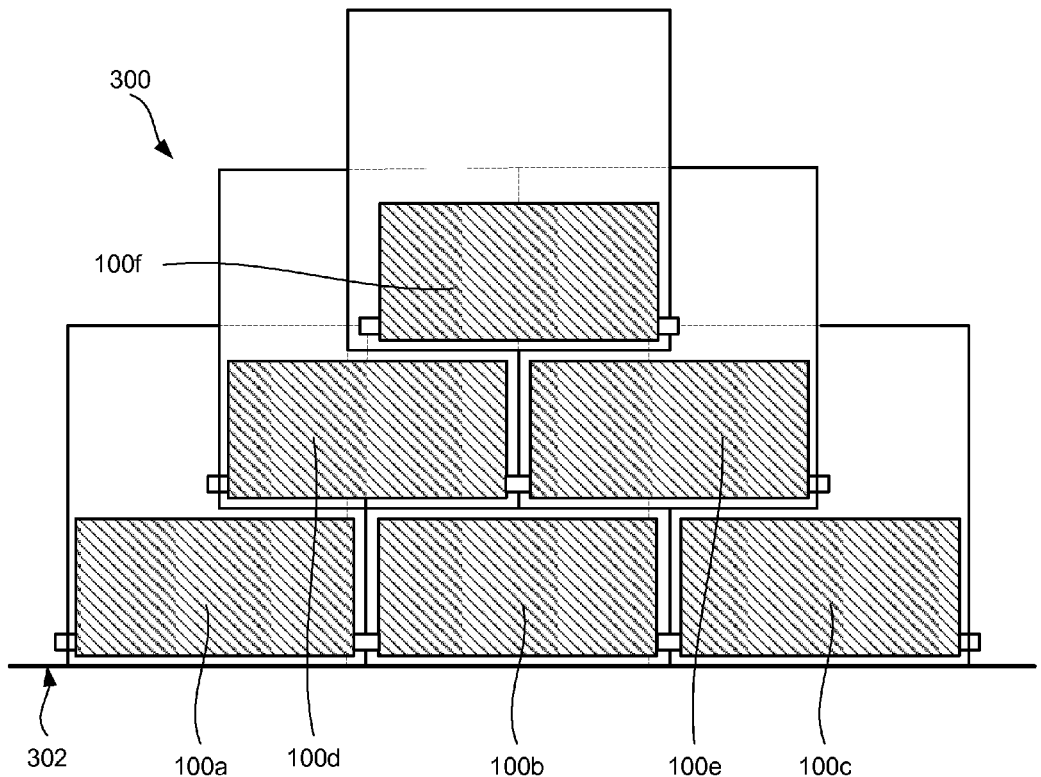
FIG. 3 illustrates a subset of a photovoltaic array that includes six BIPV modules, in accordance with certain embodiments.

FIG. 3 illustrates a photovoltaic array 300 or, more specifically, a portion of a photovoltaic array, which includes six BIPV modules 100a-100f arranged in three different rows extending along horizontal rooflines, in accordance with certain embodiments. Installation of BIPV modules 100a-100f generally starts from a bottom roofline 302 so that the top flaps of BIPV modules 100a-100f can be overlapped with another row of BIPV modules. If a side flap is used, then the position of the side flap (i.e., a left flap or a right flap) determines which bottom corner should be the starting corner for the installation of the array. For example, if a BIPV module has a top flap and a right-side flap, then installation may start from the bottom left corner of the roof or of the photovoltaic array. Another BIPV module installed later in the same row and on the right of the initial BIPV module will overlap the side flap of the initial BIPV module. Furthermore, one or more BIPV modules installed in a row above will overlap the top flap of the initial BIPV module. This overlap of a BIPV module with a flap of another BIPV module creates a moisture barrier.

Figure 4:
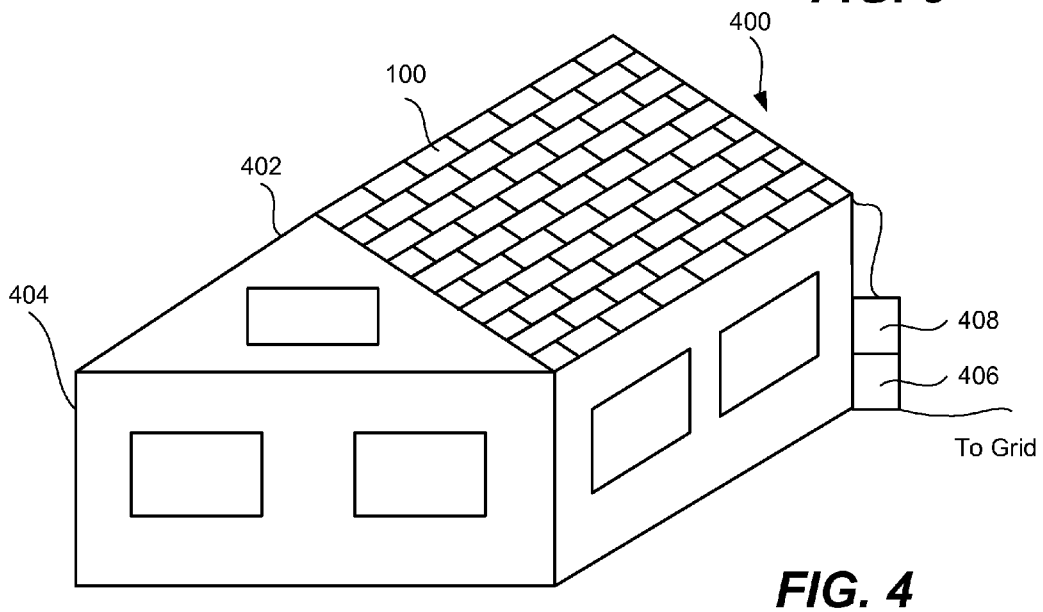
FIG. 4 is a schematic illustration of a photovoltaic array installed on a rooftop of a building structure, in accordance with certain embodiments.

FIG. 4 is a schematic illustration of a photovoltaic array 400 installed on a rooftop 402 of a building structure 404 for protecting building structure 404 from the environment as well as producing electricity, in accordance with certain embodiments. Multiple BIPV modules 100 are shown to fully cover one side of rooftop 402 (e.g., a south side or the side that receives the most sun). In other embodiments, multiple sides of rooftop 402 are used for a photovoltaic array. Furthermore, some portions of rooftop 402 may be covered with conventional roofing materials (e.g., asphalt shingles). As such, BIPV modules 100 may also be used in combination with other roofing materials (e.g., asphalt shingles) and cover only a portion of rooftop. Generally, BIPV modules 100 may be used on steep sloped to low slope rooftops. For example, the rooftops may have a slope of at least about 2.5-to-12 or, in many embodiments, at least about 3-to-12.

Multiple BIPV modules 100 may be interconnected in series and/or in parallel with each other. For example, photovoltaic array 400 may have sets of BIPV modules 100 interconnected in series with each other (i.e., electrical connections among multiple photovoltaic modules within one set), while these sets are interconnected in parallel with each other (i.e., electrical connections among multiple sets in one array). Photovoltaic array 400 may be used to supply electricity to building structure 404 and/or to an electrical grid. In certain embodiments, photovoltaic array 400 includes an inverter 406 and/or a battery pack 408. Inverter 406 is used for converting a direct current (DC) generated by BIPV modules 100 into an alternating current (AC). Inverter 406 may be also configured to adjust a voltage provided by BIPV modules 100 or sets of BIPV modules 100 to a level that can be utilized by building structure 404 or by a power grid. In certain embodiments, inverter 406 is rated up to 600 volts DC input or even up to 1000 volts DC, and/or up to 10 kW power. Examples of inverters include a photovoltaic static inverter (e.g., BWT10240—Gridtec 10, available from Trace Technologies in Livermore, Calif.) and a string inverter (e.g. Sunny Boy® 2500 available from SMA America in Grass Valley, Calif.). In certain embodiments, BIPV modules 100 may include integrated inverters (i.e., "on module" inverters). These inverters may be used in addition to or instead of external inverters. Battery pack 408 is used to balance electric power output and consumption.

Figure 5:
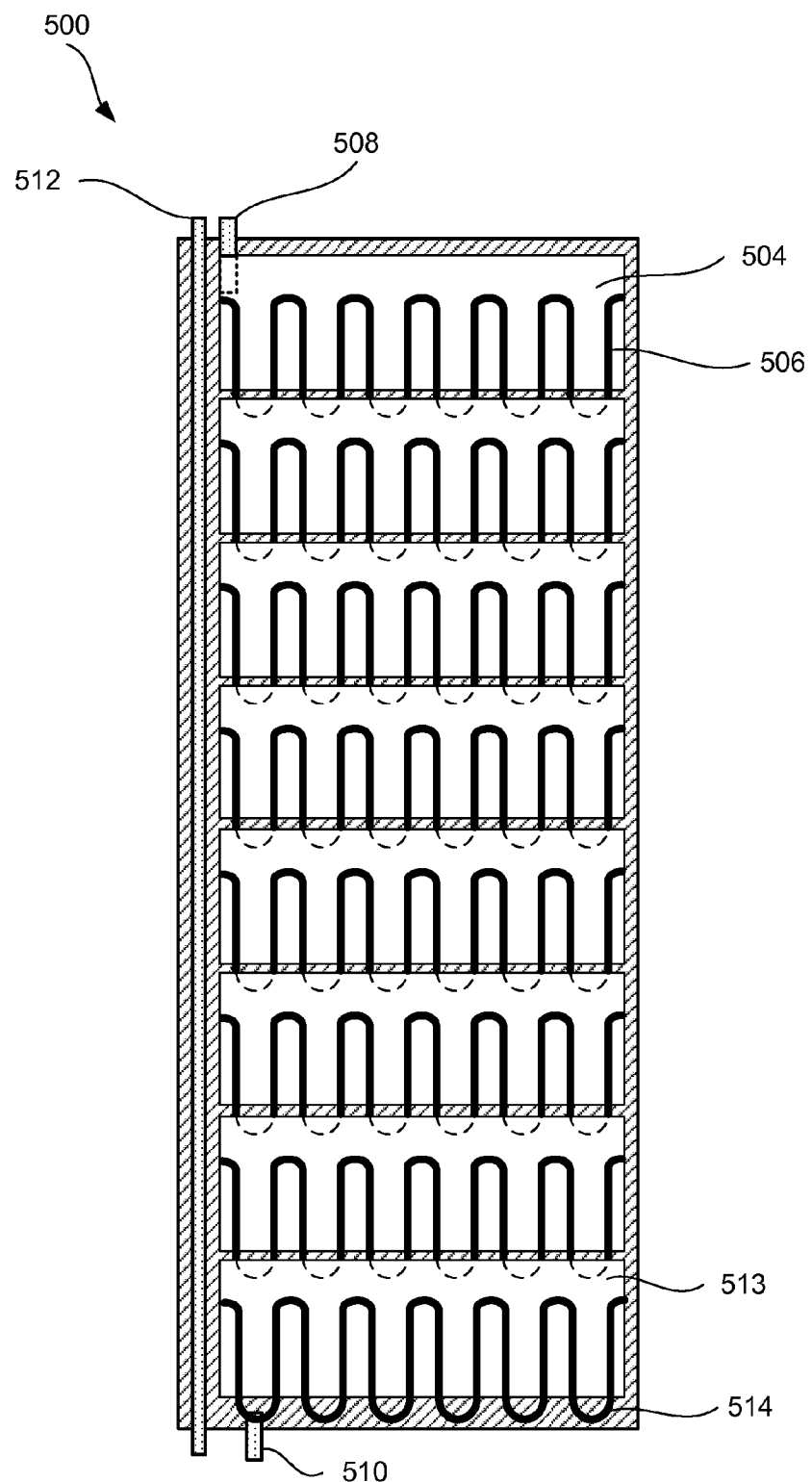
FIG. 5 is a schematic representation of a photovoltaic module having electrically interconnected photovoltaic cells, in accordance with certain embodiments.

FIG. 5 is a schematic representation of a photovoltaic module insert 500 illustrating photovoltaic cells 504 electrically interconnected in series using interconnecting wires 506, in accordance with certain embodiments. Often individual cells 504 do not provide an adequate output voltage. For example, a typical voltage output of an individual CIGS cell is only between 0.4V and 0.7V. To increase voltage output, photovoltaic cells 504 may be electrically interconnected in series (for example, as shown in FIG. 5) and/or include "on module" inverters (not shown). Interconnecting wires 506 may also be used to provide uniform current distribution and collection from one or both contact layers.

As shown in FIG. 5, each pair of photovoltaic cells 504 has one interconnecting wire positioned in between the two cells and extending over a front side of one cell and over a back side of the adjacent cell. For example, a top interconnecting wire 506 in FIG. 5 extends over the front light-incident side of cell 504 and under the back side of the adjacent cell. In the figure, the interconnecting wires 506 also collect current from the TCO layer and provide uniform current distribution, and may be referred to herein as current collectors. In other embodiments, separate components are used for current collection and cell-to-cell interconnection. End cell 513 has a current collector 514 that is positioned over the light incident side of cell 513 but does not connect to another cell. Current collector 514 connects cell 513 to a bus bar 510. Another bus bar 508 may be connected directly to the substrate of the cell 504 (i.e., the back side of cell 504). In another embodiment, a bus bar may be welded to a wire or other component underlying the substrate. In the configuration shown in FIG. 5, a voltage between bus bars 508 and 510 equals a sum of all cell voltages in insert 500. Another bus bar 512 passes through insert 500 without making direct electrical connections to any photovoltaic cells 504. This bus bar 512 may be used for electrically interconnecting this insert in series without other inserts, as further described below with reference to FIG. 6. Similar current collectors/interconnecting wires may be used to interconnect individual cells or set of cells in parallel (not shown).

Figure 6:
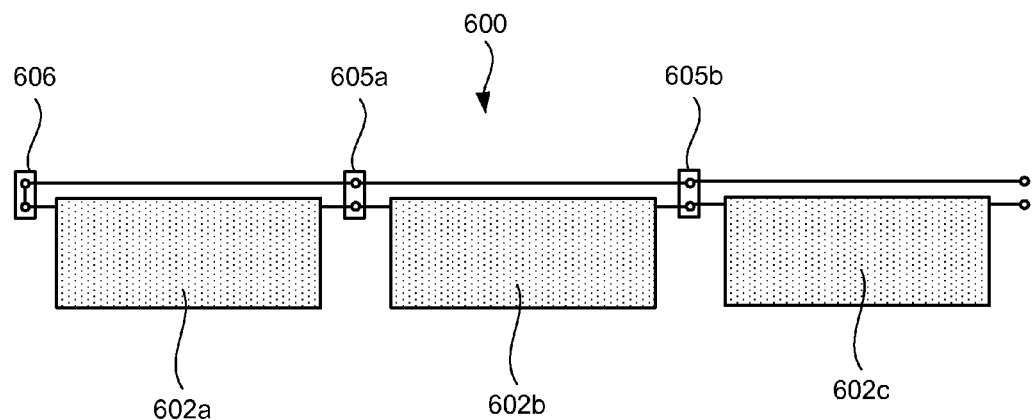
FIG. 6 is a schematic electrical diagram of a photovoltaic array having three BIPV modules interconnected in series, in accordance with certain embodiments.

BIPV modules themselves may be interconnected in series to increase a voltage of a subset of modules or even an entire array. FIG. 6 illustrates a schematic electrical diagram of a photovoltaic array 600 having three BIPV modules 602a-602c interconnected in series using module connectors 605a, 605b, and 606, in accordance with certain embodiments. A voltage output of this three-module array 600 is a sum of the voltage outputs of the three modules 602a-602c. Each module connector 605a and 605b shown in FIG. 6 may be a combination of two module connectors of BIPV modules 602a-602c. These embodiments are further described with reference to FIGS. 8A-8C. In other words, there may be no separate components electrically interconnecting two adjacent BIPV modules, with the connection instead established by engaging two connectors installed on the two respective modules. In other embodiments, separate connector components (i.e., not integrated into or installed on BIPV modules) may be used for connecting module connectors of two adjacent modules.

Module connector 606 may be a special separate connector component that is connected to one module only. It may be used to electrically interconnect two or more conductive elements of the same module connector (e.g., to close an electrical loop in a series of connections).

Figure 7:
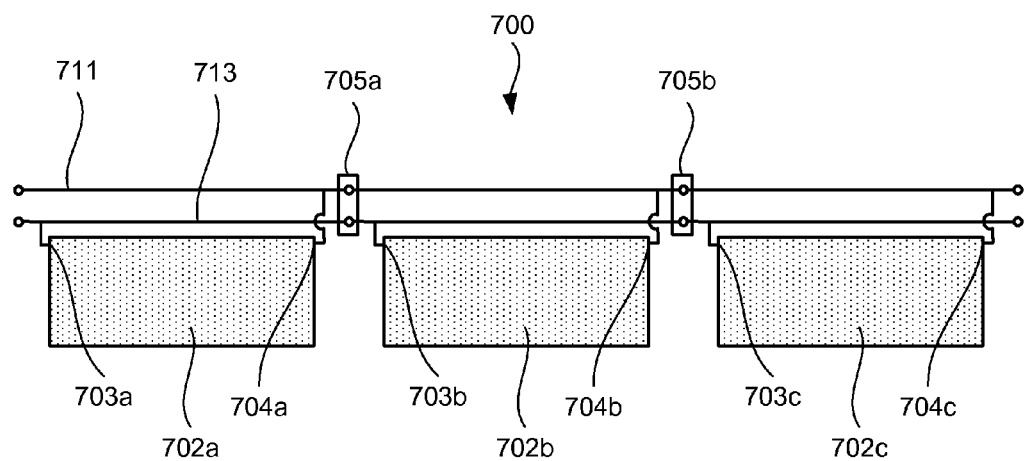
FIG. 7 is a schematic electrical diagram of a photovoltaic array having three BIPV modules interconnected in parallel, in accordance with other embodiments.

Sometimes BIPV modules may need to be electrically interconnected in parallel. FIG. 7 illustrates a schematic electrical diagram of a photovoltaic array 700 having three BIPV modules 702a-702c interconnected in parallel using module connectors 705a and 705b, in accordance with certain embodiments. Each module may have two bus bars extending through the module (i.e., a "top" bus bar 711 and a "bottom" bus bar 713, as shown in FIG. 7). Top bus bars 711 of each module are connected to right electrical leads 704a, 704b, and 704c of the modules, while bottom bus bars 713 are connected to left electrical leads 703a, 703b, and 703c. A voltage between the top bus bars 711 and bottom bus bars 713 is therefore the same along the entire row of BIPV modules 702a-702c.

Figure 8A:
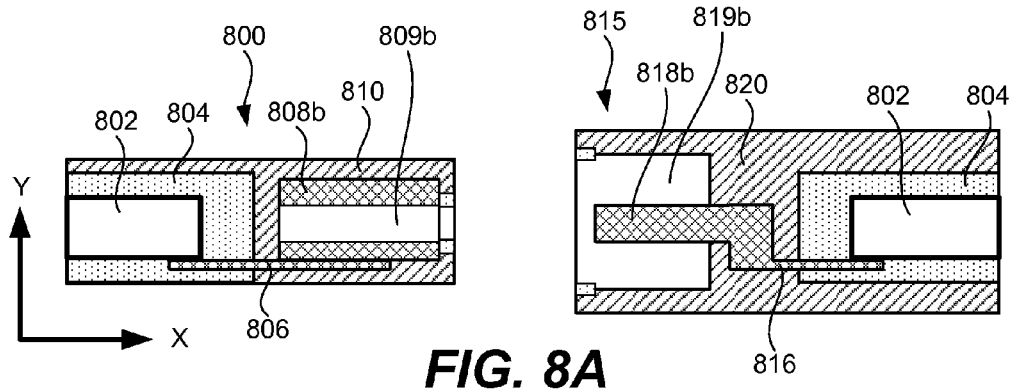
FIGS. 8A-8C are schematic cross-sectional views of two connectors configured for interconnection with each other, in accordance with certain embodiments.

FIG. 8A is a schematic cross-sectional side view of two connectors 800 and 815 configured for interconnection with each other, in accordance with certain embodiments. For simplicity, the two connectors are referred to as a female connector 800 and a male connector 815. Each of the two connectors 800 and 815 is shown attached to its own photovoltaic insert, which includes photovoltaic cells 802 and one or more sheets 804. Connectors 800 and 815 include conductive elements 808b and 818b, respectively, which are shown to be electrically connected to photovoltaic cells 802 using bus bars 806 and 816, respectively.

In certain embodiments, a conductive element of one connector (e.g., conductive element 808b of female connector 800) is shaped like a socket/cavity and configured for receiving and tight fitting a corresponding conductive element of another connector (e.g., conductive element 818b of male connector 815). Specifically, conductive element 808b is shown forming a cavity 809b. This tight fitting and contact in turn establishes an electrical connection between the two conductive elements 808b and 818b. Accordingly, conductive element 818b of male connector 815 may be shaped like a pin (e.g., a round pin or a flat rectangular pin). A socket and/or a pin may have protrusions (not shown) extending towards each other (e.g., spring loaded tabs) to further minimize the electrical contact resistance by increasing the overall contact area. In addition, the contacts may be fluted to increase the likelihood of good electrical contact at multiple points (e.g., the flutes guarantee at least as many hot spot asperities of current flow as there are flutes).

Figure 8B:
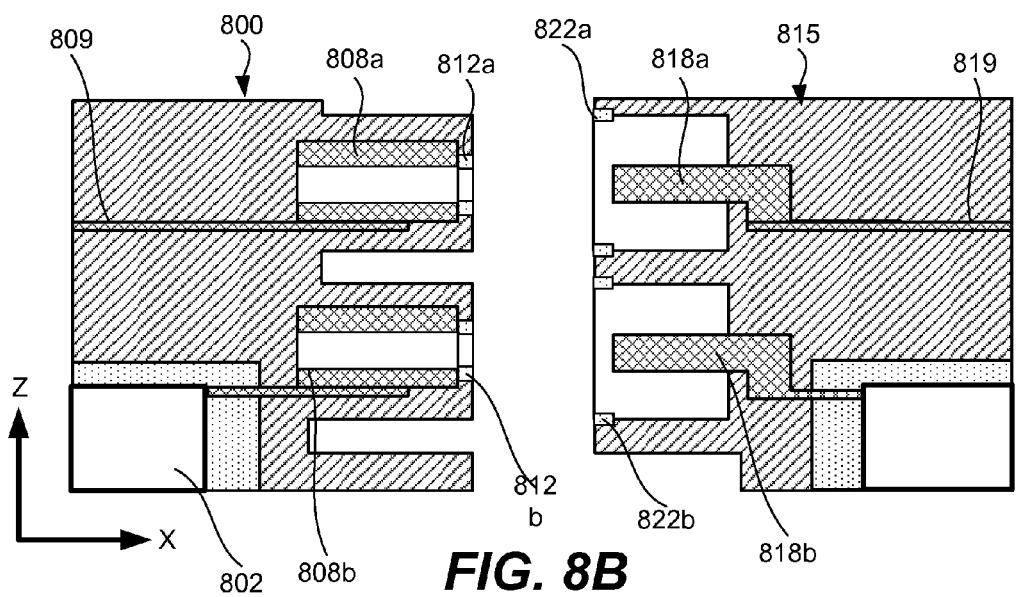
Figure 8C:
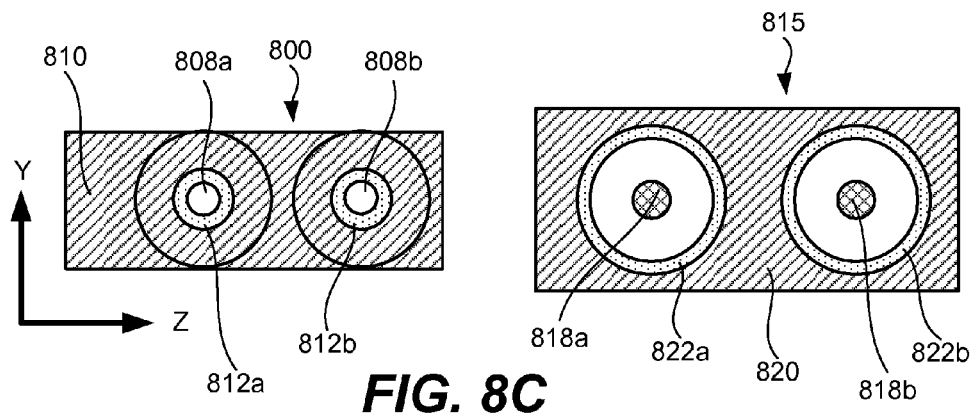

In certain embodiments, connectors do not have a cavity-pin design as shown in FIGS. 8A-8C. Instead, an electrical connection may be established when two substantially flat surfaces contact each other. Conductive elements may be substantially flat or have some topography designed to increase a contact surface over the same projection boundary and/or to increase contact force at least in some areas. Examples of such surface topography features include multiple pin-type or rib-type elevations or recesses.

In certain embodiments, one or more connectors attached to a BIPV module have a "touch free" design, which means that an installer cannot accidently touch conductive elements or any other electrical elements of these connectors during handling of the BIPV module. For example, conductive elements may be positioned inside relatively narrow cavities. The openings of these cavities are too small for a finger to accidently come in to contact with the conductive elements inside the cavities. One such example is shown in FIG. 8A where male connector 815 has a cavity 819b formed by connector body 820 around its conductive pin 818b. While cavity 819b may be sufficiently small to ensure a "touch free" designed as explained above, it is still large enough to accommodate a portion of connector body 810 of female connector 800. In certain embodiments, connector bodies 810 and 820 have interlocking features (not shown) that are configured to keep the two connectors 800 and 815 connected and prevent connector body 810 from sliding outs of cavity 819b. Examples of interlocking features include latches, threads, and various recess-protrusion combinations.

FIG. 8B is schematic plan view of female connector 800 and male connector 815, in accordance with certain embodiments. Each of the connectors 800 and 815 is shown with two conductive elements, i.e., conductive elements 808a and 808b formed as sockets in connector 800 and conductive elements 818a and 818b formed as pins in connector 815. One conductive element of each connector is shown to be electrically connected to photovoltaic cells 802. Another conductive element of each of the two connectors 800 and 815 may be connected to bus bars (e.g., bus bars 809 and 819) that do not have an immediate electrical connection to photovoltaic cells 802 of their respective BIPV module (the extended electrical connection may exist by virtue of a complete electrical circuit).

As shown, conductive elements 808a and 808b may have their own designated inner seals 812a and 812b. Inner seals 812a and 812b are designed to provide more immediate protection to conductive elements 808a and 818a after connecting the two connectors 800, 815. As such, inner seals 812a and 812b are positioned near inner cavities of conductive elements 808a and 808b. The profile and dimensions of pins 818a and 818b closely correspond to that of inner seals 812a and 812b. In the same or other embodiments, connectors 800, 815 have external seals 822a and 822b. External seals 822a and 822b may be used in addition to or instead of inner seals 812a and 812b. Various examples of seal materials and fabrication methods are described below in the context of FIG. 9. FIG. 8C is schematic front view of female connector 800 and male connector 815, in accordance with certain embodiments. Connector pins 818a and 818b are shown to have round profiles. However, other profiles (e.g., square, rectangular) may also be used for pins 818a and 818b and conductive elements 808a and 808b.

Figure 9A:
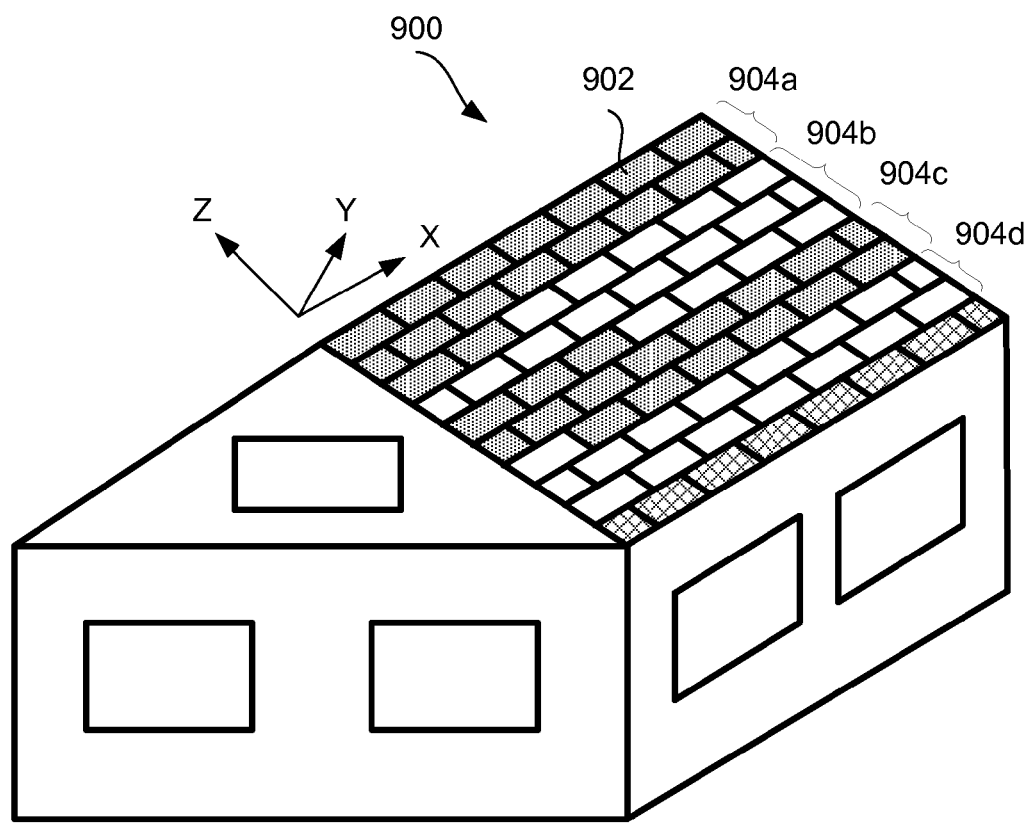
FIG. 9A is a schematic representation of a photovoltaic array positioned on a rooftop of a building structure, in accordance with certain embodiments.

FIG. 9A is a schematic representation of a photovoltaic array 900 positioned on a rooftop of a building structure, in accordance with certain embodiments. Array 900 includes multiple BIPV modules 902 arranged into four photovoltaic strings 904a-904d (each shown with different shading). All modules 902 in each string 904a-904d are electrically interconnected, but one string is not connected to any other. Electrical connections between two adjacent modules in the same row may be provided by various types of connectors extending between two adjacent connectors of these modules. Some examples of such connectors are described in U.S. patent application Ser. No. 13/046,453, entitled "SEPARABLE FLEXIBLE PHOTOVOLTAIC CONNECTOR," filed on Mar. 11, 2011, which is incorporated herein by reference in its entirety for purposes of describing external connectors.

A string may include more interconnected modules than can fit in a single row. The number of modules in a string may be driven by an overall voltage requirement of the string, operating voltages of each module, installation boundaries, obstacles, and other factors. For example, all four strings 904a-904d shown in FIG. 9A span over three rows. At the same time, strings 904a-904d have their end modules at various locations along the X direction, which makes connections between end modules difficult to establish. FIG. 9A simplifies various complexities involved in the installation of photovoltaic array. These complexities may result in even more variation of end module positions than presented in FIG. 9A. Conventional techniques and structures used for interconnecting row ends having a predetermined offset cannot be used for such arrays.

Interconnecting strips described herein can include any number of electrical components configured to interconnect BIPV modules in a photovoltaic array. Specifically, an interconnecting strip may include a base sheet made from an insulating material for supporting other components of the strip. During installation, the base sheet is extended across multiple rows of BIPV modules. Two or more terminal groups may be arranged along the length of the base sheet. Each terminal group of the interconnecting strip may be aligned with a different row of BIPV modules during installation. Connector terminals provided in each group are used for making electrical connections to one or more modules in a row or, more specifically, for making electrical connections to one or more contact points of the module connectors. Some connector terminals in different terminal groups are connected using leads for interconnecting BIPV modules in different rows.

Interconnecting strips described herein allow connecting BIPV modules positioned in multiple rows regardless of the rows' lengths and relative positions of end modules. Such interconnecting strips are sometimes referred to as interconnecting ladders, since they include multiple terminal groups positioned at a predetermined distance from each other (similar to the steps of a ladder). Each terminal group is configured to align with a different row of BIPV modules and make electrical connections to one or two modules in that row. These modules may be connected to one or more other modules forming smaller loops that are interconnected into a larger loop/strip by the interconnecting strip. When connections are made to two modules in the same row, these two modules do not have to be previous connected to each other. In certain embodiments, one or more terminal groups are not connected to any modules and may be used to provide electrical connections between adjacent terminal groups.

Two adjacent rows of BIPV modules may be offset with respect to each other for moisture barrier and aesthetic appearance reasons. The connectors of BIPV modules positioned in the two adjacent rows may also be offset. In certain embodiments, two adjacent terminal groups of the interconnecting strip have a corresponding offset to align with the module connectors in two or more adjacent rows. In these embodiments, spacing between two adjacent terminal groups generally corresponds to the width of the exposed portion of the BIPV module. In other embodiments, this spacing can be about twice the width of the exposed portion of the BIPV module, and two interconnecting strips are used for making electrical connections within the same string. Each of the two strips makes electrical connections to every other row in which module connectors are aligned. The two strips are offset with respect to each other to compensate for any offset between adjacent rows. The two strips are also electrically connected to each other. In yet other embodiments, one or more extending strips are used to compensate for any offset between adjacent rows, as further described below.

Each terminal group of an interconnecting strip may be connected to one or two modules in one row. These modules may be further connected to additional modules in that row forming one or two loops on each side of the terminal group. Typically, these modules have two contact points on each side of the module. One of these two contact points is connected to a return path, while another is connected to one or more photovoltaic cells in the module. When modules positioned in the same row are interconnected in series, the contact points of one module are connected to the corresponding two contact points of an adjacent module and so on. To form a loop, the remaining two contact points of an end module are interconnected such that the return path of the module is connected in series with the photovoltaic cells of the module. (Such interconnection of two contact points of the same connector may be also be referred to as jumping of the connector and may be performed using a device called a jumper. An example of jumper interconnecting two contact points of a connector is jumper 1010A shown in FIG. 10A. Jumpers may be also used for making electrical connections between two or more connector terminals of the same terminal group in an interconnecting strip, such as jumper 1008a shown in FIG. 10B, which interconnects terminals 1006a and 1006b.) The other end of the loop is connected to the strip. Each terminal group of the strip may be connected to two such loops, and each loop may include any number of interconnected modules. In certain embodiments, a loop contains no modules and has only a jumper for interconnecting two connector terminals that would otherwise be used for making electrical connections to contact points of a module, such as jumper 1011 shown in FIG. 10A. Besides connections between modules of the loops as well as a jumper on one end and connections to a strip on another end, a loop generally does not have any additional connections. However, in certain embodiments, a loop may include a connection to an inverter and/or a connection to another interconnecting strip as further explained below with reference to FIG. 12D.

An interconnecting strip can be configured to extend across multiple rows and under the BIPV modules (i.e., in between the modules and the building structure). This positioning of the strip helps to protect the strip and electrical connections between the strip and modules from the environment. To make electrical connections to the strip, contact points of the BIPV modules can be provided on the back sides of the modules in a location that does not overlap with other BIPV modules. Generally, this location corresponds to a selected part of the flap that is separated from the photovoltaic portion by a predetermined distance.

Figure 9B:
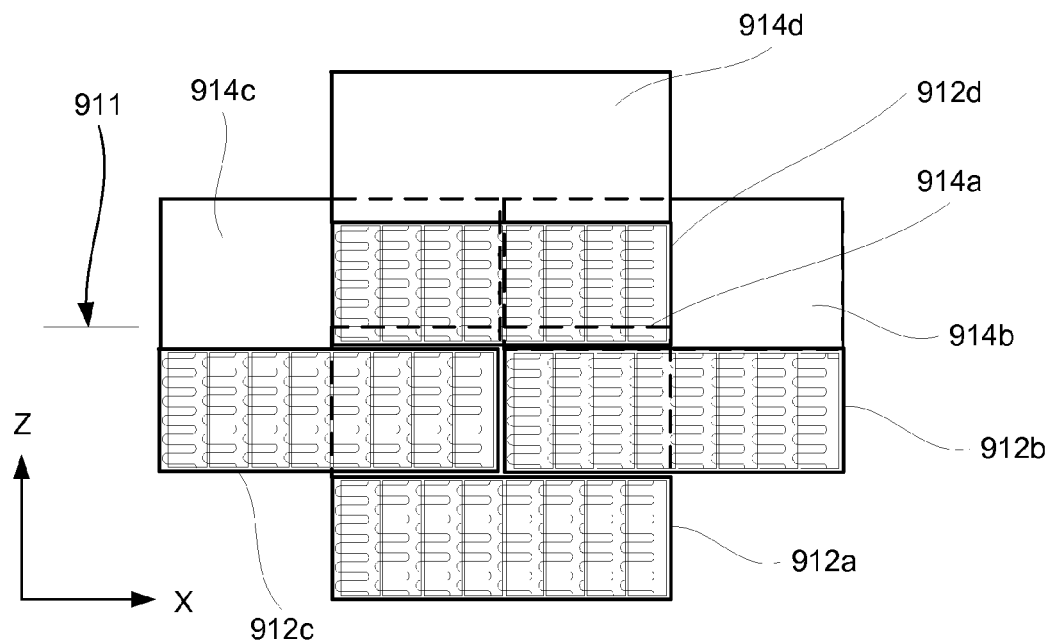
FIG. 9B is a schematic representation of four installed modules showing various overlaps between these modules, in accordance with certain embodiments.

To provide a better understanding of overlaps and interferences between BIPV modules during and after installation of the array, a schematic representation of four installed modules showing various overlaps between these modules is provided in FIG. 9B. Each of these BIPV modules includes a photovoltaic portion (elements 912a-912d) containing one or more photovoltaic cells and a flap portion (elements 914a-914d) attached to the flap portion and extending under photovoltaic portions of two adjacent modules. Specifically, a flap portion 914a (shown with a dotted line as it is completely covered by other modules in this view) extends under photovoltaic portions 912b and 912c to protect an interface between these two photovoltaic portions. Generally, some small gap exists between two adjacent modules, and an overlap between a flap portion of the module in the adjacent row and two photovoltaic portions of the adjacent modules helps to seal that gap. The flap portion also extends slightly beyond the photovoltaic portion and under another module in the third row to fully seal the gap. In the example shown in FIG. 9B, flap portion 914a extends to level 911 (shown on the left) and under some of photovoltaic portion 912d. Therefore, there is also some overlap between flap portion 914a and flap portions 914b and 914c below level 911. As such, to avoid interference with flap portion 914a, contact points of the two middle BIPV modules are positioned on the back sides of their respective flap portions 914b and 914c above level 911 (i.e., these contact points have a predetermined offset in the Z direction from photovoltaic portions 912b and 912c). For clarity, various electrical components of these modules are not shown in FIG. 9B and will not be explained in more detail with reference to FIG. 9C.

Figure 9C:
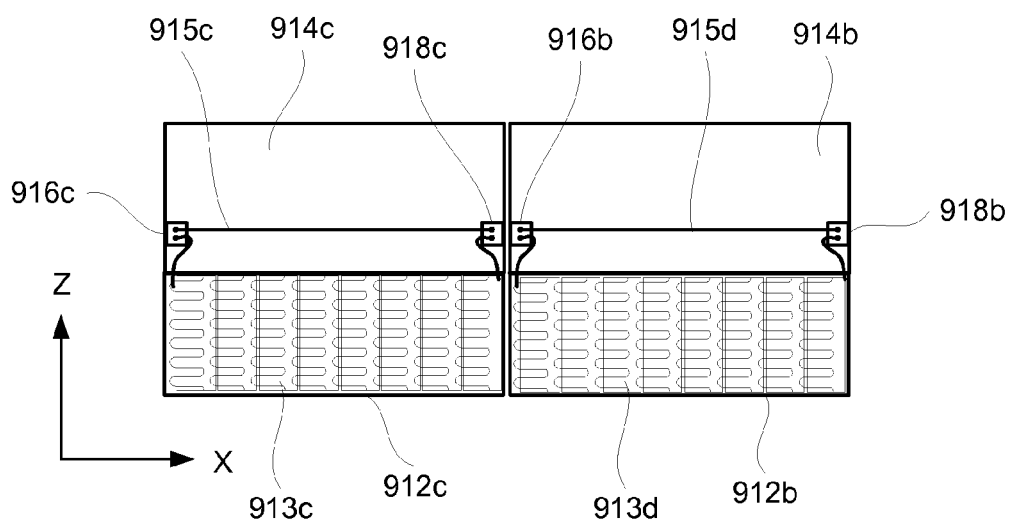
FIG. 9C is a schematic representation of the back sides of the two middle modules presented in FIG. 9B, in accordance with certain embodiments.

FIG. 9C is a schematic representation of the back sides of the two middle modules presented in FIG. 9B, in accordance with certain embodiments. Specifically, FIG. 9C illustrates the positions of connectors 916b and 918b on flap portion 914b and the positions of connectors 916c and 918c on flap portion 914c. As stated above, these connectors or, more specifically, their contact points are positioned at a predetermined distance in the Z direction from photovoltaic portions 912b and 912c.

One contact point of each connector 916b, 918b, 916c, and 918c is shown connected to the photovoltaic cells 913c and 913d of their respective modules, while another contact point is shown connected to return paths 915c and 915d. A return path may extend along the length of each module in the X direction and interconnect two corresponding contact points on each side of the module. Before installation, the return path is not connected to any other components of the module. When these two modules are provided adjacent to each other in a row, respective contact points of connectors 916b and 918c may be interconnected using an internal or external connector. Specifically, contact points connected to photovoltaic cells 913c and 913d may be interconnected with each other, while contact points connected to return paths 915c and 915d may be separately interconnected with each other thereby establishing two separate sets of independent connections. Alternatively, contact points of connectors 916b and 918c may be connected to respective connector terminals of the same terminal group of an interconnecting strip. Furthermore, when these two modules belong to two different strings, the two contact points of each one of these two connectors are interconnected but no connections are provided between the two connectors. Alternatively, contact points of one or both connectors may be connected to an inverter. Some of these embodiments are further explained below with reference to various string configurations having multiple BIPV modules connected using interconnecting strips.

Figure 10A:
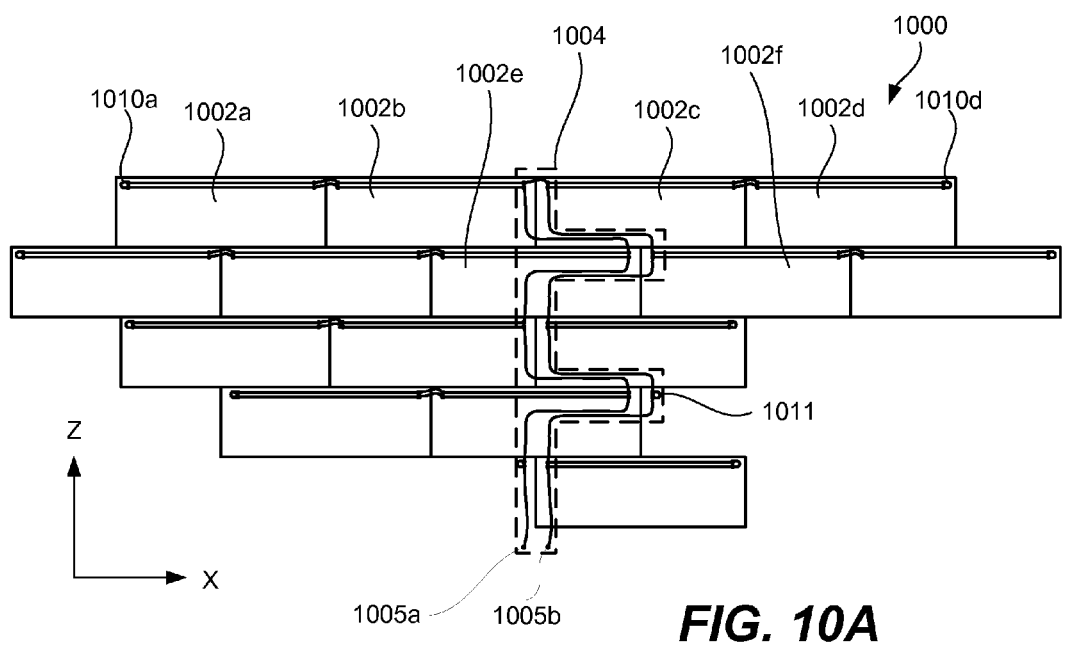
FIG. 10A is a simplified schematic representation of a string including fifteen BIPV modules electrically connected using an interconnecting strip, in accordance to certain embodiments.

FIG. 10A is a simplified schematic representation of a string 1000 including fifteen BIPV modules electrically connected using an interconnecting strip 1004, in accordance to certain embodiments. For simplicity, photovoltaic and flap portions are not specifically identified. Photovoltaic cells are also not shown. Instead, one of the lines extending between two connectors represents a set of photovoltaic cells, while another line represents a return path. Furthermore, location of module connectors, particularly in the Z direction, is not precisely defined and is presented for illustrative purposes only. For example, connectors may be positioned under the flap portions as it has been described above. The modules shown in FIG. 10A and other following figures may correspond to the one shown in FIGS. 9A and 9B.

String 1000 extends over five rows, with each row having different number and/or arrangement of BIPV modules. In general, a string may have any number of modules, rows of modules, and various kinds of arrangements of the modules in each row. In the example illustrated in FIG. 10A, the top first row includes four modules 1002a-1002d. These four modules form two substrings, each having two interconnected modules. Specifically, the left substring includes modules 1002a and 1002b, while the right substring includes modules 1002c and 1002d. Each of the two substrings is independently connected to interconnecting strip 1004. Modules in each substring are interconnected using, for example, various internal or external connectors. End contact points of each of end modules 1002a and 1002d are interconnected at their free ends by, for example, jumpers 1010a and 1010d, respectively. In this manner, the left and right substrings each form a small loop on each side of interconnecting strip 1004, and interconnecting strip 1004 connects all of these small loops into a common loop. In a similar manner, two right terminals of module 1002e represent ends of a left loop in the second row including three modules, which is also connected to interconnecting strip 1004. Two left terminals of module 1002f represent ends of a right loop in the second row including three modules, which is also connected to interconnecting strip 1004. Similar connections are provided in the third, fourth, and fifth rows.

Each loop may have any number of modules or no modules at all. For example, a right loop in the fourth row includes one jumper 1011 but no modules. Furthermore, any one of these loops may have an inverter connection. FIG. 10A depicts inverter connections 1005a and 1005b, for example. In some embodiments, one inverter can be provided per each string. The inverter connection may be provided at any point along the string between terminals or contact points that otherwise would have been interconnected. For example, a jumper of any end module may be replaced with inverter connections, while inverter connections 1005a and 1005b shown in FIG. 10A may be interconnected. For clarity, inverter connections 1005a and 1005b are shown as separate terminals on the interconnecting strip. However, it is understood that a string can represent a continuous loop of interconnected modules with an inverter connection provided anywhere along this loop. In some embodiments, inverter connections can be moved along the loop by interconnecting the original inverter connections and disconnecting any two previously connected terminals and/or contact points to form new inverter connections.

Electrical connections between the top two rows of BIPV modules shown in FIG. 10A will now be explained in more detail with reference to FIG. 10B, which is an expanded view of the interface between interconnecting strip 1004 and the top two rows of BIPV modules, in accordance with certain embodiments. Two right terminals 1006a and 1006c of module 1002b represent the ends of one loop (i.e., the left first-row loop) that includes modules 1002b and 1002a (module 1002a is not shown in FIG. 10B). Two left terminals 1006b and 1006d of module 1002c represent the ends of another loop (i.e., the right first-row loop) that includes modules 1002c and 1002d (module 1002d is not shown in FIG. 10B). Interconnecting strip 1004 includes terminals that overlie and connect to each of the terminals 1006a-1006h of the modules 1002b, 1002c, 1002e, and 1002f. Interconnecting strip 1004 may include a jumper 1008a between terminals 1006a and 1006b to interconnect these two loops into a larger first-row loop that includes all modules in that row. Alternatively, jumper 1008a may be installed onto interconnecting strip 1004 or modules 1002b and 1002c during installation of the array. The end connections (which may be also referred as an opening) to this loop is represented by terminals 1006c and 1006d. Jumper 1008a thereby integrates all the modules in the first row. An end row in a string can have a corresponding jumper provided on the interconnecting strip, as will be further evident from FIGS. 10C, 11A-11B, and 12B-12D. The end-of-the-row jumpers may be preinstalled onto the end modules or provided during installation of the array.

To form electrical connections between the first row and second row, interconnecting strip 1004 includes two connecting leads 1008b and 1008c. Specifically, connecting lead 1008b connects terminal 1006c of module 1002b with terminal 1006e of module 1002e. Likewise, connecting lead 1008c connects terminal 1006d of module 1002c with terminal 1006g of module 1002f. It should be noted that two right terminals 1006e and 1006f represent the ends of another loop that includes the left three modules in the second row, while two left terminals 1006g and 1006h represent the ends of yet another loop that includes the right two modules in that row. At the same time, terminals 1006c and 1006d represent end connections of the first row common loop. Therefore, interconnecting terminals 1006c and 1006d with terminals 1006e and 1006g using connecting leads 1008b and 1008c, respectively, effectively unites the first row common loop with the two loops in the second row and forms a new first-and-second row common loop having end connections provided by terminals 1006f and 1006h.

Returning to FIG. 10A, similar connection schemes are applied to the remaining three rows. Specifically, each row is connected with an adjacent row by a set of two connecting leads, thereby integrating side loops into the overall common loop, which represents an entire string when all five rows are interconnected. The last (fifth) row is shown with two connecting leads extending to inverter connections 1005a and 1005b, which represent the opening to the entire string 1000. In other embodiments, two terminals of the last row may be interconnected similar to terminals 1006a and 1006b in the first row (FIG. 10B), with inverter connections provided at any other connections along the loop, according to the desired embodiment.

A group of terminals of the interconnecting strip that corresponds to one row of modules is referred herein as a terminal group. A number of terminals in each group may vary. Specifically, this number may depend on types of connectors provided on BIPV modules (e.g., two contact point connectors), a number of modules to be connected to each terminal group (e.g., one or two), switching capabilities of the terminal group as further described below with reference to FIGS. 11A and 11B, and other factors. In certain embodiments, one or more terminal groups have two connector terminals each as, for example, shown in FIG. 12A, described further below. This type of terminal group may be used for making electrical connections to a single module having two contact points. An interconnecting strip having such terminal groups may be used for interconnecting multiple rows of modules by making connections to end modules in these rows. In the same or other embodiments, one or more terminal groups may have four connector terminals each. In the example of FIG. 10B, a terminal group of interconnecting strip 1004 has four connector terminals. One terminal group includes terminals to connect to terminals 1006a-1006d of modules 1002b and 1002c, for example. This type of terminal group may be used for making electrical connections to two modules, with each having two contact points. An interconnecting strip having such terminal groups may be used for interconnecting multiple rows of modules by making connections anywhere along the length of these rows. In the same or other embodiments, one or more terminal groups may have six connector terminals (for example, the top terminal group in FIG. 13) and/or eight connector terminals (as, for example, shown FIGS. 11A and 11B). This type of terminal group may have switching capabilities, which allows for changing the configurations and connection schemes provided by these terminal groups in the field. These examples are described below in more detail with reference to FIGS. 11A and 11B.

Figure 10B:
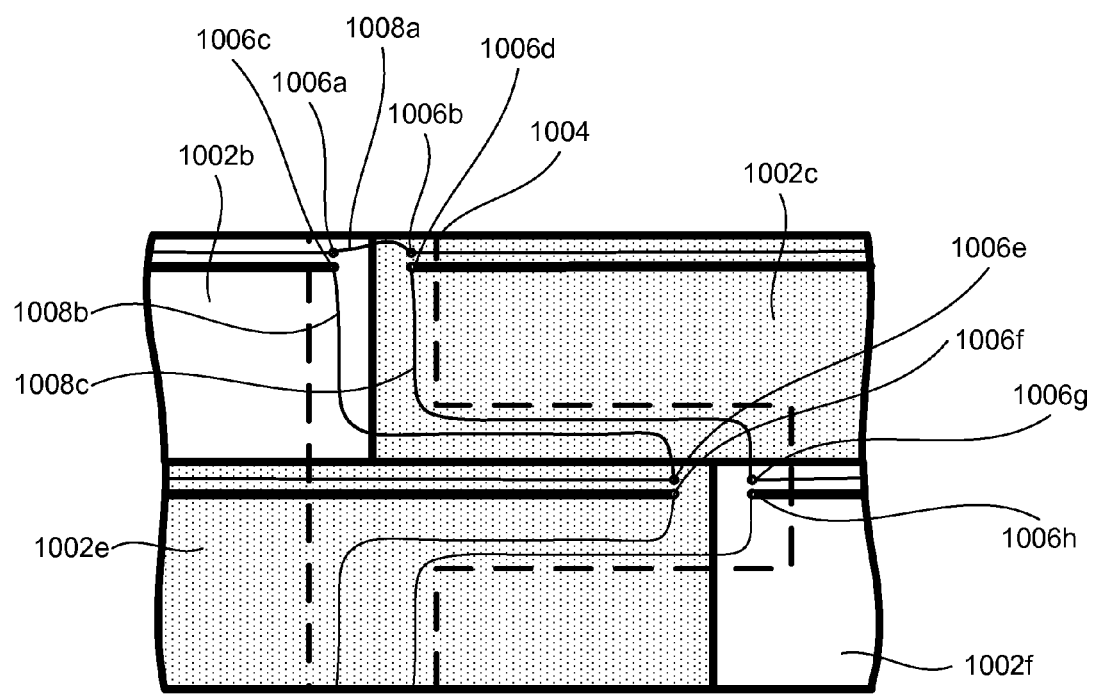
FIG. 10B is an expanded view of the interface between the interconnecting strip and the top two rows of BIPV modules shown in FIG. 10A, in accordance with certain embodiments.

As shown in FIGS. 10A and 10B, two adjacent terminal groups of an interconnecting strip 1004 may be offset with respect to each other in the X direction (i.e., along the length of the module rows or along the width of interconnecting strip 1004). This offset may accommodate an offset between modules in adjacent rows or, more specifically, may accommodate an offset of their connectors. Modules can be offset for sealing and aesthetic reasons. In certain embodiments, this offset is about half of the module's length (i.e., the size of the module in the X direction) or about a third of the module's length. However, other offset values may be used as well.

To support multiple terminal groups having such offsets, a sufficiently wide interconnecting strip may be provided. Alternatively, one terminal group may be provided on a main portion, which may be referred to as a trunk of the interconnecting strip, while another group may be provided on an extending arm and may be referred to as a branch attached to the main portion as, for example, shown with dotted lines in FIGS. 10A and 10B. In certain embodiments, an extending arm may be separable from the main portion as further explained with reference to FIG. 13B. In other embodiments further described below with reference to FIG. 12B, two interconnecting strips can be used for interconnecting alternate rows (i.e., one strip is used for making connections to the first, third, and/or fifth rows and so on, while another strip is used for making connections to the second, fourth, and/or six rows and so on). Since the first, third, and/or fifth rows are not offset with respect to each other, the first interconnecting strip may have all of its terminal groups in line. Likewise, the second, fourth, and/or six rows are not offset, and the second interconnecting strip may have all of its terminal groups in line. However, the two strips are offset with respect to each other to accommodate an offset between adjacent rows.

In certain embodiments, two interconnecting strips are connected to each other to extend the length of the strip. For example, an interconnecting strip may have one or two pairs of terminal connectors on one or both of its ends (along the length of the strip) for connecting to other strips or making electrical connections to inverters.

Figure 10C:
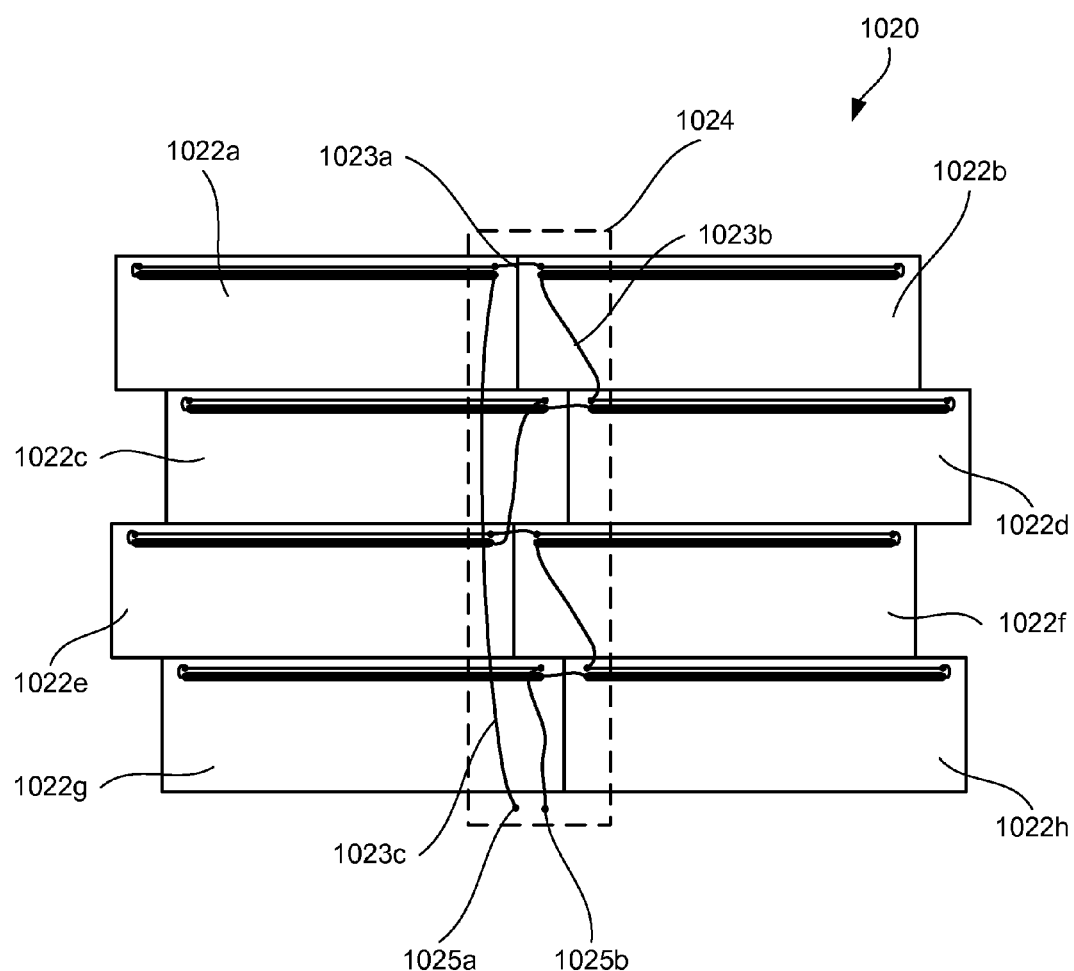
FIG. 10C is a schematic representation of a string including eight modules connected in series with each other using an interconnecting strip, in accordance with certain embodiments.

Interconnecting strips may be used to provide different interconnecting schemes. One example is presented in FIGS. 10A and 10B, while another is illustrated in FIG. 10C. Instead of using two connecting leads for interconnecting two adjacent terminal groups, only one lead may be used. Another connection is provided by an overall connecting lead extending between two end terminal groups or between one end terminal group and an inverter connection. This overall connecting lead may be referred to as a vertical return path to distinguish it from the horizontal return paths provided by modules. In certain embodiments, the overall connecting lead may be provided by interconnecting multiple smaller connecting leads. Each one of these smaller leads may extend between two adjacent terminal groups similar to leads 1008b and 1008c in FIG. 10B. However, unlike leads 1008b and 1008c in FIG. 10B, these smaller leads are connected to each other and to module connectors.

In an example, FIG. 10C illustrates a string 1020 including eight modules 1022a-1022h connected in series with each other using an interconnecting strip 1024, in accordance with certain embodiments. For simplicity, FIG. 10C illustrates two modules in each row. End terminals of each of these modules are interconnected at the module's free end. In this manner, each module forms a smaller loop connected to interconnecting strip 1024 that aggregates these eight smaller loops into string 1020. Each of these smaller loops may have any number of modules or no modules at all. Furthermore, interconnecting strip 1024 may be used for connecting any number of rows.

Top contact points of modules 1022a and 1022b are interconnected using jumper 1023a that may be a part of interconnecting strip 1024 or provided as a separate component. The interconnection of two contact points in the first row is similar to other examples presented elsewhere in this document. As elsewhere, bottom v. top references as applied to contact points are arbitrary and by no means limiting to physical orientation of the actual connector elements of these modules.

A bottom contact point of module 1022a is connected to one end of an overall connecting lead 1023c, which is a part of interconnecting strip 1024. The other end of this lead may be connected to an inverter connection 1025a as shown in FIG. 10C or to one of the contact points of the module in the bottom row (i.e., if inverter connections are provided at some other point in the string). A bottom contact point of module 1022b is connected to a top contact point of module 1022d using an internal lead 1023b of interconnecting strip 1024. Using interconnecting strip 1024, module 1022d has its bottom contact point connected to a bottom contact point of module 1022c. These connections form a loop including four modules 1022a-1022d between the bottom contact points of module 1022a (or inverter connection 1025a) and the bottom contact point of module 1022c.

Continuing down the rows of string 1020, a top contact point of module 1022c is connected to a bottom contact point of module 1022e, and top contact points of modules 1022e and 1022f are interconnected. These connections add two more modules to the loop, which now has six modules 1022a-1022f between the bottom contact point of module 1022a (or inverter connection 1025a) and a bottom contact point of module 1022f. The bottom contact point of module 1022f is connected to a top contact point of module 1022h, while the bottom contact points of modules 1022g and 1022h are also interconnected. A top contact point of module 1022g may be connected to another inverter connection 1025b (as shown in FIG. 10C) to form a loop including all eight modules 1022a-1022h between inverter connections 1025a and 1025b. Alternatively, the top contact points of modules 1022g and 1022h may be interconnected and inverter connections may be provided at any other points of string 1020.

To provide additional flexibility during installation of a photovoltaic string, an interconnecting strip may include various switches or jumpers that allow for changing connections between different terminals of the interconnecting strip. Switches and jumpers can be adjusted (e.g., added or removed, moved to a different position) to form new electrical connections and disconnect previous connections in the field as needed. Two examples of such jumpers are presented in FIGS. 10B and 10C, i.e., elements 1008a and 1023a respectively, which can be separate components provided during installation of the photovoltaic array. Other examples of switches and jumpers will now be described in more detail with reference to FIGS. 11A and 11B.

Figure 11A:
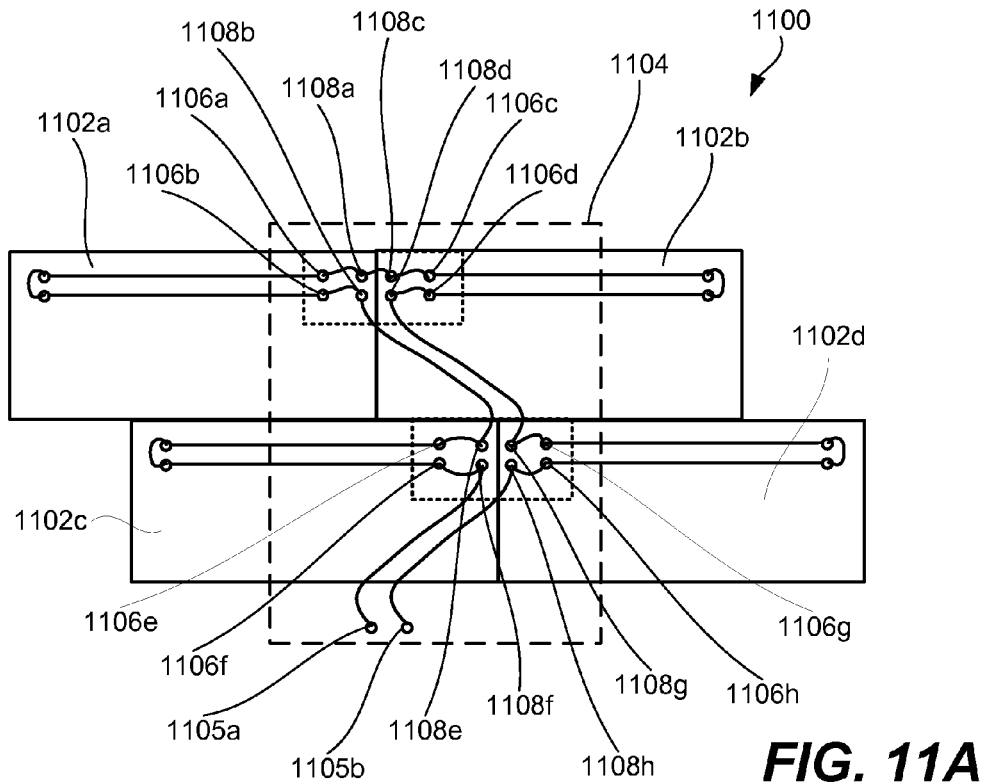
FIGS. 11A and 11B are simplified schematic representations of two photovoltaic arrays each including the same four BIPV modules and interconnecting strip, in accordance with certain embodiments.
Figure 11B:
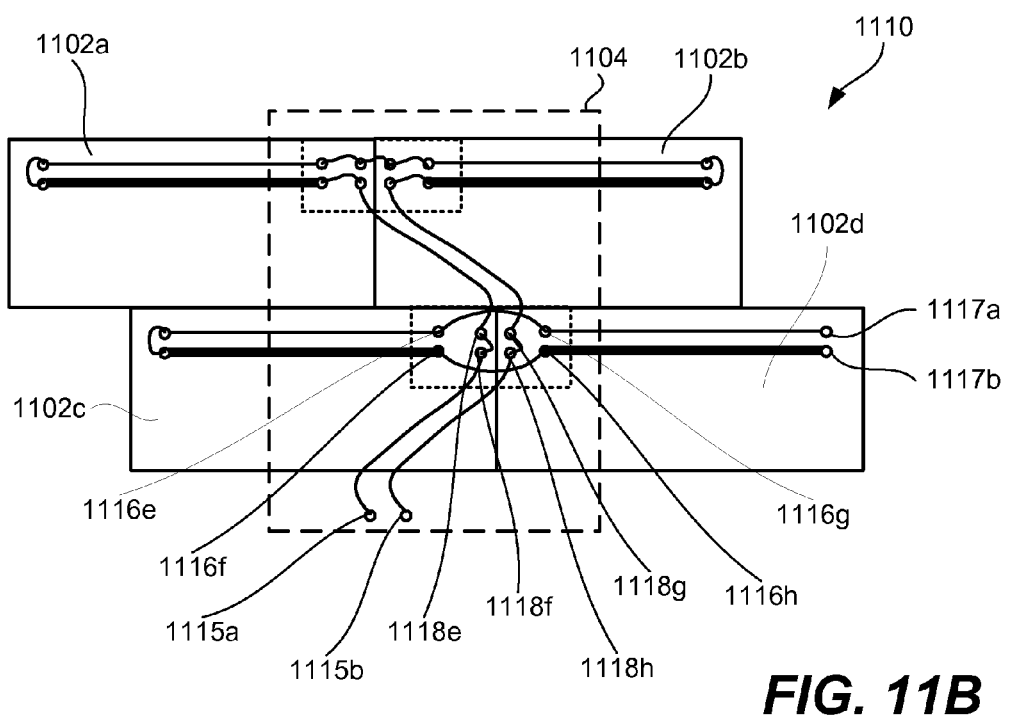

FIGS. 11A and 11B are simplified schematic representations of two photovoltaic arrays 1100 and 1110 including the same four BIPV modules 1102a-1102d and interconnecting strip 1104, in accordance with certain embodiments. In FIG. 11A, all four BIPV modules 1102a-1102d are interconnected in series into a single string by interconnecting strip 1104 or, more specifically, by arranging the switches of interconnecting strip 1104 in a way to provide electrical connections to all four modules. In FIG. 11B, switches in the interconnecting strip 1104 are arranged differently, and the four modules 1102a-1102d form two separate strings, one including modules 1102a and 1102b and another string including modules 1102c and 1102d.

Specifically, interconnecting strip 1104 is shown to have two terminal groups (identified with dotted lines) such that each terminal group is aligned with a different row of modules. Each terminal group includes eight connector terminals. Four connector terminals in each group are configured to make electrical connections to respective contact points of the modules. These connector terminals may be referred to as external connector terminals to distinguish them from internal connector terminals that make electrical connections only to other connector terminals of the interconnecting strip and that do not make any electrical connections external to the interconnecting strip. The connection between the external connector terminals and contact points of the modules may be the same in both FIG. 11A and FIG. 11B configurations. Specifically, external connector terminals 1106a and 1106b are connected to top and bottom contact points of module 1102a, respectively. Likewise, external connector terminals 1106c and 1106d are connected to top and bottom contact points of module 1102b, respectively. External connector terminals 1106e and 1106f are connected to top and bottom contact points of module 1102c, respectively, while external connector terminals 1106g and 1106h are connected to top and bottom contact points of module 1102d, respectively.

Four other connector terminals in each terminal group are not directly connected to contact points of the modules and may be referred to as internal connector terminals. As explained above, the internal connector terminals make electrical connections to other connector terminals of the interconnecting strip, such as some external connector terminals and other internal connector terminals. These connections may be provided in the same terminal group and between two different terminal groups. Switches may allow changing these connections in the field as needed (for example, to move from a connection scheme illustrated in FIG. 11A to a connection scheme illustrated in FIG. 11B). Differences in these connection schemes will now be explained.

Starting with FIG. 11A, internal connector terminal 1108a is connected to external connector terminal 1106a. Similar connections are provided between terminals 1108b and 1106b, between terminals 1108c and 1106c, and between terminals 1108d and 1106d. Furthermore, internal connector terminals 1108a and 1108c are also connected. Since modules 1102a and 1102b have their end connectors jumped (i.e., have contact points of the end connectors interconnected) at their other free ends, these connections form a loop between terminals 1108a and 1108d including these two modules.

A similar connection scheme is provided in the second terminal group, i.e., terminal 1108e is connected to terminal 1106e, terminal 1108f to terminal 1106f, terminal 1108g to terminal 1106g, and terminal 1108h to terminal 1106h. However, instead of interconnecting terminals 1108e and 1108g, these terminals are connected using connecting leads to terminals 1108b and 1108d, respectively. Modules 1102c and 1102d are jumped at their other ends. Furthermore, terminals 1108f and 1108h are connected to inverter connectors 1105a and 1105b, respectively. Overall, this connection scheme creates a loop of four modules 1102a-1102d open to inverter connectors 1105a and 1105b. As described above, in different embodiments, a loop may be closed at the bottom by interconnecting terminals 1108f and 1108h and opened at any other previously connected terminals for making connection to an inverter.

Proceeding to FIG. 11B, modules 1102a and 1102b remain interconnected according to the same scheme (i.e., connections in the first terminal group remain the same). However, connections in the second terminal group are changed to disconnect modules 1102c and 1102d from modules 1102a and 1102b. At the same time, modules 1102c and 1102d are interconnected into a separate second string, which may have its own inverter connectors 1117a and 1117b. These inverter connectors 1117a and 1117b provide separate power output that is different from output provided by inverter connectors 1115a and 1115b. In certain embodiments, these two sets of inverter connectors, i.e., inverter connectors 1115a and 1115b and inverter connectors 1117a and 1117b, may be connected to different inverters. To distinguish connections shown in FIG. 11A from connections shown in FIG. 11B, connector terminals of the second terminal group in FIG. 11B are labeled with different reference numbers than in FIG. 11A. However, one would understand that arrays 1100 and 1110 may be the same physical structure. As noted above, a change from array 1100 to array 1110 may be performed by simply adjusting one or more switches of interconnecting strip.

Specifically, FIG. 11B illustrates terminal 1116e connected to terminal 1116g. Similarly, terminal 1116f is now connected to terminal 1116h. Module 1102c may remain jumped at the opposite end, while module 1102d is shown with two right connectors available for connecting to an inverter or other electrical components of the second string. Neither one of these four external connector terminals 1116e-1116g is connected to any internal connector terminals 1118e-1118g. Instead, terminals 1118e-1118g are used for providing connections from modules 1102a and 1102b to inverter connections 1115a and 1115b. Terminals 1118e and 1118g are connected to connecting leads extending from the first terminal group. Furthermore, terminal 1118e is connected to terminal 1118f, which in turn is connected to inverter connection 1115a. Likewise, terminal 1118g is connected to terminal 1118h, which in turn is connected to inverter connection 1115b. Therefore, modules 1102a and 1102b form a first loop connected to inverter connectors 1115a and 1115b, while modules 1102c and 1102d form a second independent loop not connected to inverter connectors 1115a and 1115b.

In certain embodiments, the switching of electrical connections between various connector terminals is performed automatically. For example, a terminal group of the interconnecting strip may adjust its switches upon establishing a connection with one or more modules. This switching may be initiated when modules are being mechanically attached to (e.g., lowered onto) the interconnecting strip. A terminal group may include levers that are pushed on by a module during installation to change a position of the switch. For example, before any modules are connected to a terminal group, the terminal group may simply interconnect two sets of connecting leads attached to this group. When a module is positioned over this terminal group, a switch may be activated such that a connection between one set of these leads is broken and a connection is provided through the contact leads of this module.

In certain embodiments, an interconnecting strip is used for making electrical connections to row ends or, more specifically, to single modules positioned at the end of each row. In other words, a strip is connected only to one module in each row, instead of two. A number of connector terminals in each terminal group of such strips may be reduced by half. For example, only two connector terminals may be needed in each terminal group for making connections to contact points of the end module in that row. Additional connector terminals may be used to provide switching capabilities and/or for making connections to an inverter; however, these connector terminals are optional.

Figure 12A:
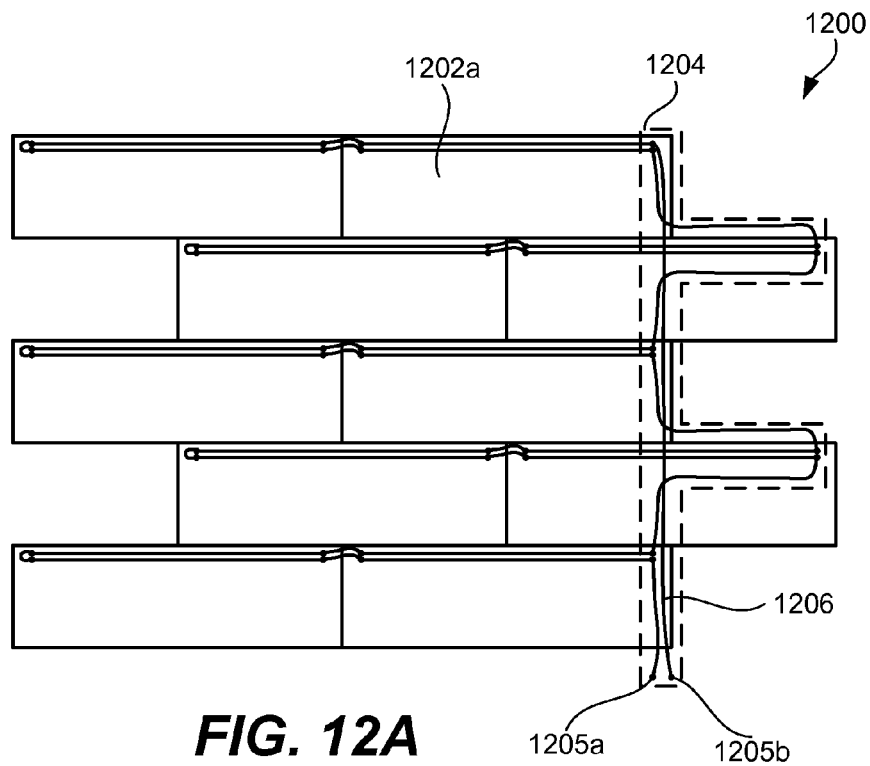
FIG. 12A is a schematic representation of a photovoltaic string including ten BIPV modules connected by an interconnecting strip, in accordance with certain embodiments.

FIG. 12A is a schematic representation of a photovoltaic string 1200 including ten BIPV modules connected by an interconnecting strip 1204, in accordance with certain embodiments. The ten modules are arranged into five rows, with each row including two modules connected to each other and jumped at the left end. Therefore, each set of two modules represents a smaller loop with an opening on the right. The right end of each row or, more specifically, the right contact points of the right modules in each row, are connected to corresponding terminal connectors of interconnecting strip 1204. Specifically, two contact points of module 1202a in the first row are connected to two respective connector terminals in the first terminal group. One connector terminal in that group is connected directly to an inverter connector 1205*b* by a drop line 1206 of the interconnecting strip 1204. A drop line can also be referred to as a vertical return path. Another connector terminal is connected to a terminal in the second row to unite the loops of the first and second rows of modules and so on until the last connector terminal in the fifth row is connected to another inverter connector 1205*a*.

Figure 12B:
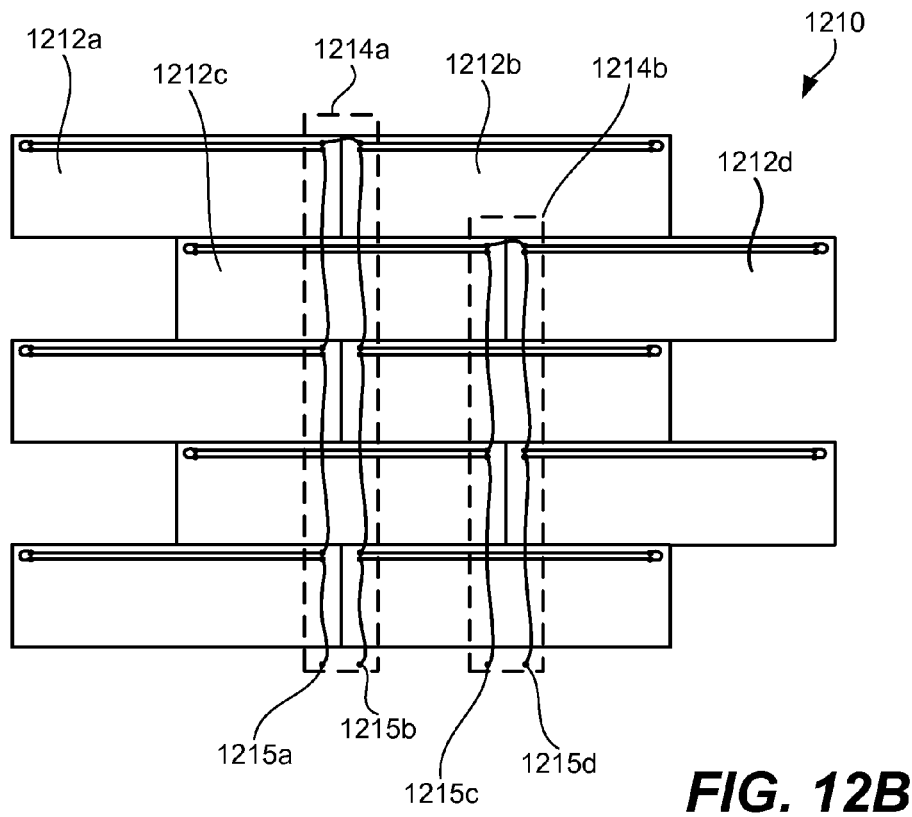
FIG. 12B is a schematic representation of a string having two interconnecting strips for interconnecting alternate rows of modules in the same string, in accordance with certain embodiments.

In certain embodiments, an interconnecting strip is connected to modules in each row. However, other connection configurations are possible. For example, FIG. 12B is a schematic representation of a string 1210 having two interconnecting strips 1214*a* and 1214*b* for interconnecting alternate rows, in accordance with certain embodiments. This configuration does not require any offset between two adjacent terminal groups in either one of interconnecting strips 1214*a* and 1214*b*, because the strips are only connected to modules that are aligned with each other (i.e., modules in every other row). Specifically, interconnecting strip 1214*a* is connected to modules 1212*a* and 1212*b* in the first top row as well as to modules in the thirds and fifth rows. As shown in FIG. 12B, all modules in these rows are aligned with respect to each other. At the same time, interconnecting strip 1214*b* is connected to modules 1212*c* and 1212*d* in the second row as well as to modules in the fourth row. Likewise, modules in these two rows are aligned. Therefore, the terminal groups of interconnecting strips 1214*a* and 1214*b* are not offset. However, the two strips are offset with respect to each other to accommodate an offset between adjacent rows as shown in FIG. 12B.

In the example shown in FIG. 12B, interconnecting strip 1214*a* forms a loop containing six modules and having contact points 1215*a* and 1215*b*, while interconnecting strip 1214*b* forms a loop containing four modules and having contact points 1215*c* and 1215*d*. To electrically integrate two loops into a single string, two of these contact points (e.g., points 1215*b* and 1215*c*) may be interconnected and the remaining two contact points will become contact points of the integrated string.

In certain embodiments, a string of photovoltaic modules does not have continuous boundaries and may include two or more groups of modules that are physically separated from each other. The separation may be in either one of two directions (i.e., along the rows or across the rows) or both. Furthermore, two or more groups may be completely separated (i.e., modules of different groups do not touch each other as, for example, shown in FIG. 12C) or partially separated (e.g., some modules of different groups touch each other and may be connected to each other as, for example, shown in FIG. 12D). In partially separated examples, some rows may be disjointed and separated by other building components. At the same time, all modules in such strings can be interconnected. Interconnecting strips may be very helpful in this regard and eliminate a need for additional custom wiring of these separate groups of modules.

Figure 12C:
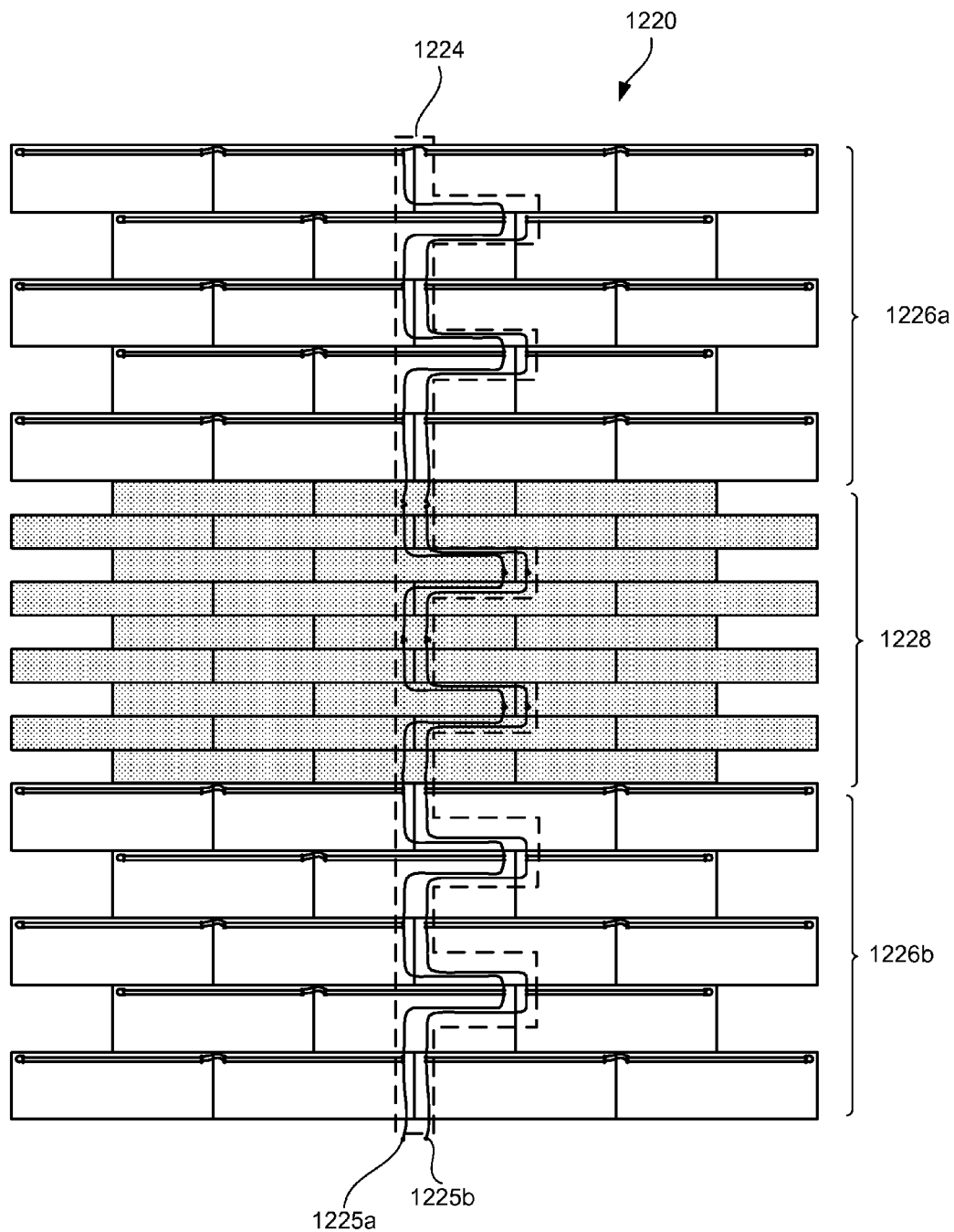
FIG. 12C is a schematic representation of a string including two groups of modules separated by a building component positioned in between the rows, in accordance with certain embodiments.

FIG. 12C is a schematic representation of a string 1220 including two groups of modules 1226*a* and 1226*b* separated by a building component 1228, in accordance with certain embodiments. For example, two groups of modules 1226*a* and 1226*b* may be installed on a rooftop and separated by a patch of asphalt shingles. Such a configuration may be used to overcome obstacles on the building structure or for other reasons. Two portions of interconnecting strip 1224 overlap with the two groups of modules 1226*a* and 1226*b* and form connections to modules in the two groups (for example, in a manner similar to the one described above with reference to FIG. 10). Another portion of interconnecting strip 1224 extends across building component 1228 and connects the two other portions of the strip, effectively acting as an extension cord. Terminal groups of this portion may be interconnected to each other to complete the overall electrical loop and join the two smaller electrical loops (i.e., loops formed by the two groups of modules 1226*a* and 1226*b*) into string 1220. Ends of this string are represented by inverter connections 1225*a* and 1225*b*. Connections to the string may also be made at any other location.

Figure 12D:
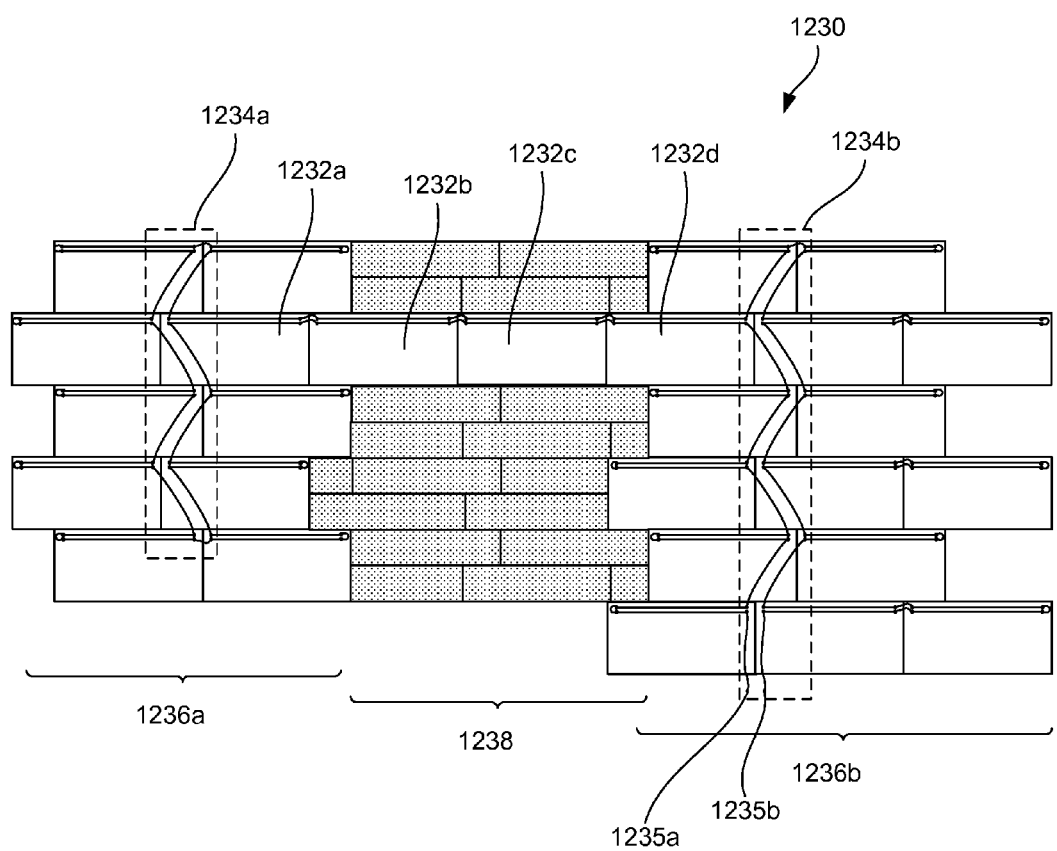
FIG. 12D is a schematic representation of another string that has two groups of modules separated in the horizontal direction by a building component, in accordance with certain embodiments.

FIG. 12D is a schematic representation of another string 1230 that has two groups of modules 1236*a* and 1236*b* separated in the horizontal direction by a building component 1238, in accordance with certain embodiments. Connections across the rows in the left group 1236*a* are provided by an interconnecting strip 1234*a*. This group forms a loop with an opening provided by contact points of module 1232*a*. These contact points are connected to contact points of module 1232*b* and then to contact points of module 1232*c* and 1232*d*. Module 1232*d* is connected to an interconnecting strip 1234*b*, which also provides connections across the rows in the right group 1236*b*. Therefore, modules 1232*a*-1232*d* effective integrate the groups 1236*a* and 1236*b* in the horizontal direction into string 1230. Ends of this string are represented by inverter connections 1235*a* and 1235*b*; however, any other contacts in the string may be used for this purpose.

Figures 13A, 13B:
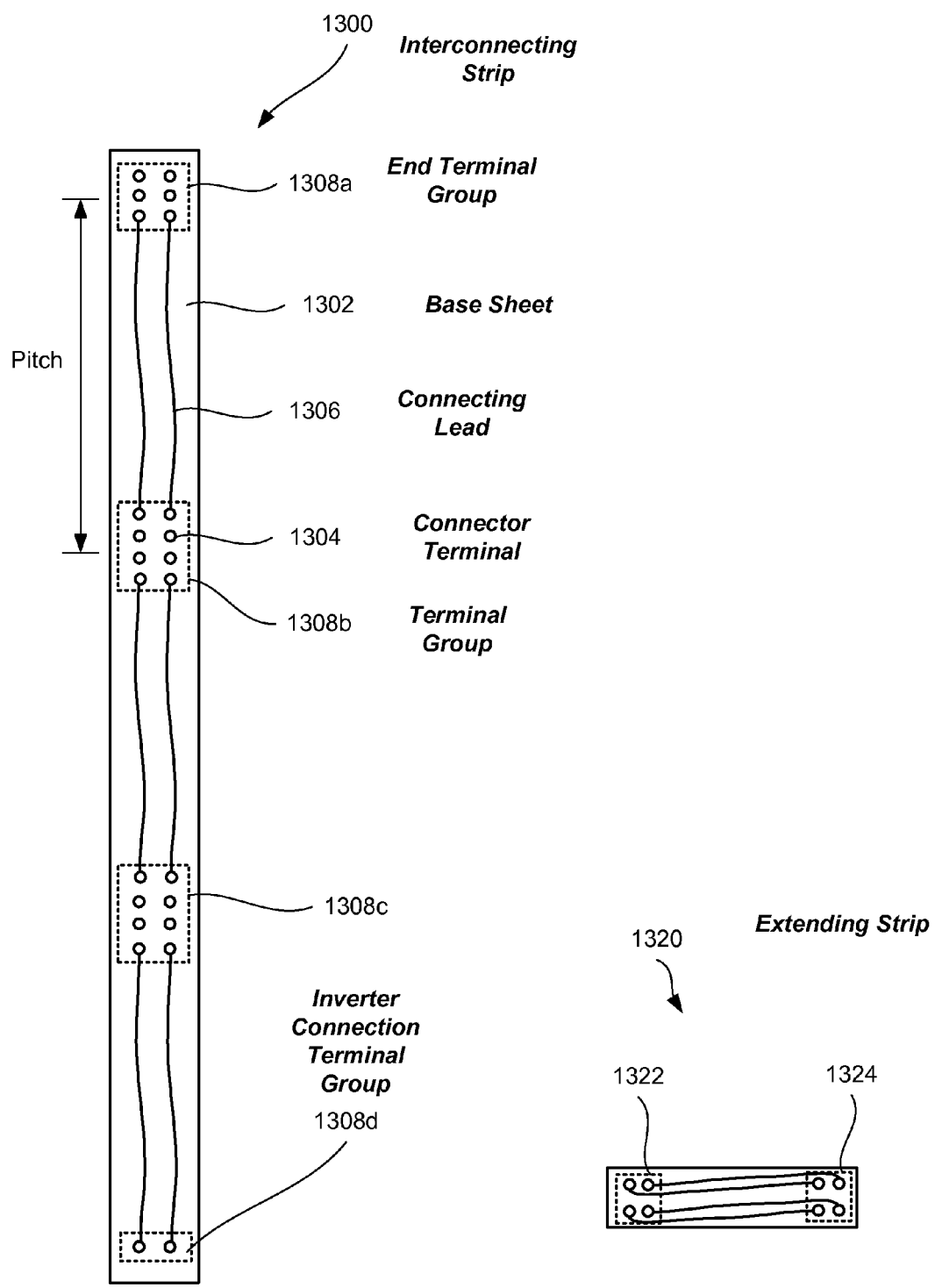
FIG. 13A is a schematic representation of an interconnecting strip for electrically connecting multiple rows of BIPV modules, in accordance with certain embodiments.
FIG. 13B is a schematic representation of an extending strip for connecting to a terminal group of the interconnecting strip and providing an offset connection, in accordance with certain embodiments.

FIG. 13A illustrates an interconnecting strip 1300 for providing electrical connections across multiple rows of BIPV modules, in accordance with certain embodiments. Interconnecting strip 1300 includes a base sheet 1302 made from one or more insulating materials. These insulating materials may be either rigid or flexible. While rigid materials may provide some structural integrity to the interconnecting strip, flexible materials may accommodate differences in coefficients of thermal expansion and the misalignments of modules. Furthermore, flexible material may allow for forming rolls out of interconnecting strips and using these rolls during transportation and storage. This feature may help with handling particularly long interconnecting strips that may be configured to extend over a larger number of rows. Also, interconnecting strips may be integrated into a continuous roll structure from which one or more strips may be cut according to their length requirements.

Some examples of flexible materials include polyethylene, polypropylene, thermoplastic olefins, thermoplastic rubber, thermoplastic elastomer, ethylene propylene diene, monomer (EPDM), fluoroelastomers or thermoplastic vulcanizates (TPV), and flexible cast thermoset materials, such as urethanes or silicones. In general, various flexible thermoplastic elastomers that have suitable thermally durable behavior may be used. Some specific examples include SANTOPRENE® (Supplied by Exxon Mobil in Houston, Tex.), HIPEX® (Supplied by Sivaco in Santa Clara, Calif.), EFLEX® (Supplied by E-Polymers Co., Ltd. in Seoul, Korea), ENFLEX® (Supplied by Enplast Limited in Longford, Ireland), EXCELINK® (Supplied by JSR Corporation in Tokyo, Japan), SYNOPRENE® (Supplied by Synoprene Polymers Pvt. Ltd. in Mumbai, India), and Elastron® (Supplied by Elastron Kimya in Kocaeli, Turkey). Some examples of rigid materials include polyethylene terephthalate (e.g., RYNITE® available from Du Pont in Wilmington, Del.), polybutylene terephthalate (e.g., CRASTIN® also available from Du Pont), nylon in any of its engineered formulations of Nylon 6 and Nylon 66, polyphenylene sulfide (e.g., RYTON® available from Chevron Phillips in The Woodlands, Tex.), polyamide (e.g., ZYTEL® available from DuPont), polycarbonate (PC), polyester (PE), polypropylene (PP), and polyvinyl chloride (PVC) and weather able engineering thermoplastics such as polyphenylene oxide (PPO), polymethyl methacrylate, polyphenylene (PPE), styrene-acrylonitrile (SAN), polystyrene and blends based on those materials. Furthermore, weatherable thermosetting polymers, such as unsaturated polyester (UP) and epoxy, may be used. Both rigid and flexible materials described above and elsewhere in this document may include engineered polymers, which are specifically formulated to meet certain requirements specific for photovoltaic applications. For example, certain hybrid block co-polymers may be used.

Base sheet 1302 provides mechanical support to other electrical components, such as terminal groups 1308a-1308d and connecting leads 1306. Electrical components may be from one or more conductive materials, such as copper, aluminum, nickel, silicon, beryllium, tin, tellurium, silver, phosphorous, cobalt, iron, zinc, chromium, zirconium, magnesium, titanium, and combinations thereof. The flexibility of electrical components may match to that of base sheet 1302. For example, connecting leads 1306 may be formed as stranded wires or flat strips shaped as a sinusoid or have any other suitable shaped profile, such as a series of repeated waves or other bent features.

Terminal groups 1308a-1308d are used for making electrical connections to the contact points of BIPV modules and/or other electrical components of the array, such as inverters and other interconnecting strips. Each terminal group may have at least two connector terminals 1304. A number of connector terminals in a group may depend on a number of connections to be made by this connector as described above. For example, a terminal group configured for making electrical connections to two BIPV modules may have at least four connector terminals. A terminal group configured for making electrical connections to one BIPV module or an inverter may have at least two connector terminals, as for example, inverter connection terminal group 1308d. Additional connector terminals may be used for providing switching capabilities as described above. In certain embodiments, one end terminal group configured for making electrical connections to two BIPV modules in the end row of the string includes a jumper for interconnecting two contact points of these modules.

Two adjacent terminal groups may be separated by a predetermined distance from each other along a length of base sheet 1302. This predetermined distance is sometimes referred to as a pitch of the interconnecting strip. In certain embodiments, an interconnecting strip is configured for connecting to every row of the string and the pitch is substantially the same as the width of the exposed portion of BIPV modules. In other embodiments, an interconnecting strip is configured for making electrical connections to every other row of the string and the pitch is about twice the width of the exposed portion.

Connecting leads 1306 extend along the length of base sheet 1302 and electrically connect the connector terminals 1304 in terminal groups 1308a-1308d. Connecting leads 1306 may connect terminals in the adjacent groups as, for example, shown in FIG. 13A and, in certain embodiments, connect terminals in end terminal groups as, for example, shown in FIG. 10C. The later example is referred to as a drop line, drop lead or a vertical return path.

Figure 13C:
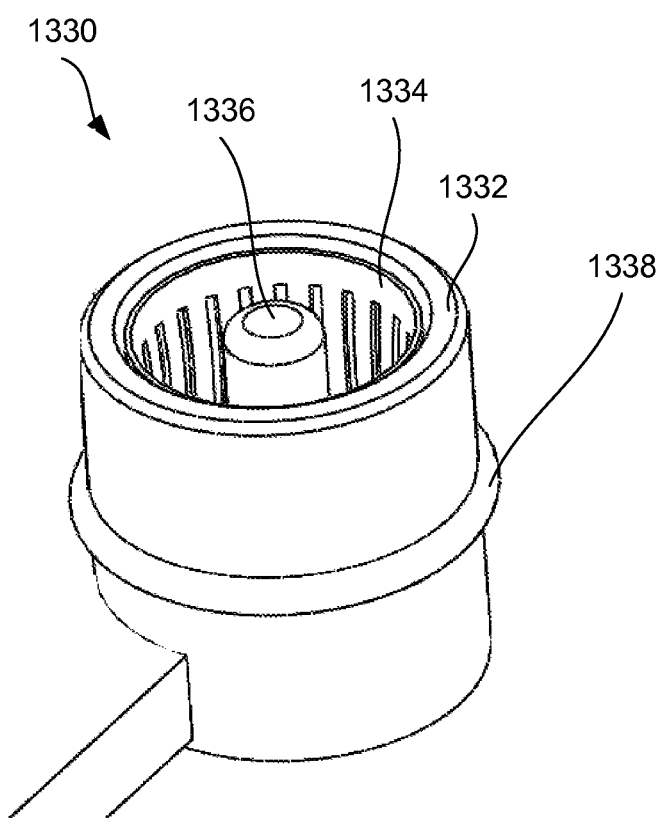
FIG. 13C is a schematic expanded view of a connector terminal having a socket shape, in accordance with certain embodiments.

Connector terminals 1304 may include sockets extending substantially perpendicular to base sheet 1302 for connecting to contact points of BIPV modules. Connector terminals that are not connected to BIPV modules may have different designs and are generally not exposed. FIG. 13C is a schematic expanded view of a connector terminal 1330 having a socket shape, in accordance with certain embodiments. Connector terminal 1330 includes a conductive element 1334 positioned within an insulating shell 1332. Conductive element 1334 is configured to form an electrical connection with a corresponding BIPV module or, more specifically, with a contact point of the module. Conductive element 1334 may be made from one or more of the conductive materials listed above. Some these conductive elements may be directly connected to connecting leads, while others may be connected to internal jumpers and switches of the local terminal group.

In certain embodiments, conductive element 1334 forms a cavity for insertion of a contact point of the module. The cavity may include an insulating pin 1336 to prevent the accidental touching of conductive element 1334 prior to installation. Insulating pin 1336 may be made from the same materials as insulating shell 1332. Some examples of such insulating materials are the materials are listed above. In certain embodiments, the base sheet, insulating shell 1332, and insulating pin 1336 are made in a single operation, such as injection molding utilizing single stage or multiple stage injection cycles. In other embodiments, these components are made from different materials and may be mechanically interconnected by over-molding or other techniques. For example, insulating shell 1332 and insulating pin 1336 may be made from one or more of the rigid materials listed above. In the same embodiments, the base sheet may be made from one or more of the flexible materials listed above. The mechanical connection between these components that are made from different materials may be provided by over-molding one material over another material. Furthermore, electrical components insulated by these materials may provide some structural support. In specific embodiments, insulating shells 1332 and insulating pins 1336 may be formed in an initial injection molding operation, while the base sheet extending over some portions of insulating shells 1332 may be formed in a later injection molding operation. The overlap between two materials is generally referred to as overmold. In the same or other embodiments, an initial injection molding operation may be used to form mechanical supports to some electrical components, (e.g., conductive element 1334) with respect to other elements (e.g., electrical leads) of the connector terminal. This injection molding operation usually uses special mechanical supports positioned within the molding cavity of the injection molding apparatus. These mechanical supports are then removed, and the process proceeds with another injection molding operation to form other components of the connector.

Connector terminal 1330 may include a seal 1338 extending around insulating shell 1332 and configured to seal the mechanical connection or, more specifically, any gap between connector terminal 1330 and a portion of the module used for connecting to connector terminal. The seal may be formed using an O-ring or other sealing components and material, (e.g., silicone sealant, butyl rubber inserts). In certain embodiments, a corresponding seal is provided on a module in addition to or instead of seal 1338 on connector terminal 1330.

In certain embodiments, at least two adjacent terminal groups are offset with respect to each other in a direction along a width of base sheet 1302. As described above, this offset may be used to accommodate an offset between adjacent rows of BIPV modules, which may be implemented for sealing and aesthetic reasons. In other embodiments, all or most terminal groups of interconnecting strip are aligned. Some terminal groups are connected directly to BIPV modules, while others are connected through an extending strip, which may be also referred to as a lateral connector. One example of such extending strip is shown in FIG. 13B. Specifically, extending strip 1320 includes two terminal groups 1322 and 1324 and multiple connecting leads providing connections between these two groups.

Figure 14:
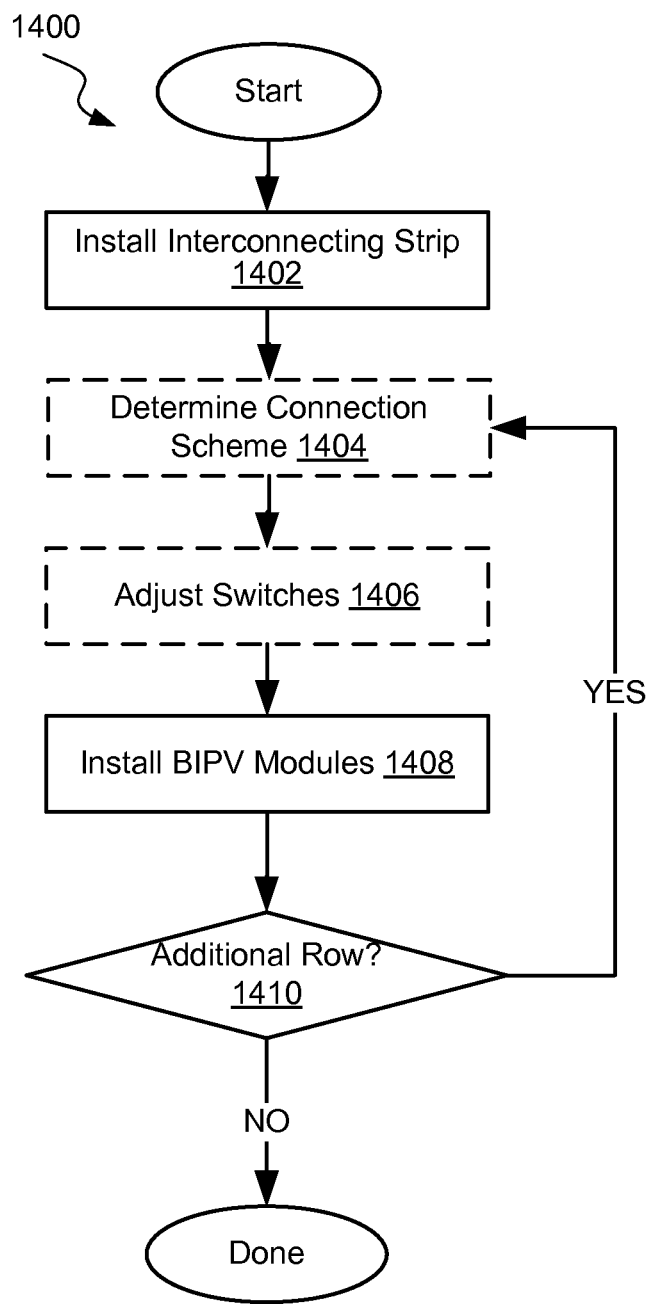
FIG. 14 is a flow chart corresponding to a process for forming a photovoltaic string containing multiple rows of interconnected BIPV modules on a building structure, in accordance with certain embodiments.

FIG. 14 is a flow chart corresponding to a process 1400 for forming a photovoltaic string containing multiple rows of interconnected BIPV modules on a building structure, in accordance with certain embodiments. Process 1400 may start with installing an interconnecting strip on a building structure in operation 1402. The interconnecting strip may be aligned such that rows of BIPV modules will extend substantially perpendicular to the strip. Furthermore, the interconnecting strip may be positioned in a location that provides an overlap with a maximum number of rows in the string. In this operation, the back sheet of the interconnecting strip may be mechanically fastened to the building structure using nails, screws, staples, or some other type of fastener. When modules are later installed over the interconnecting strip, the strip may provide additional mechanical support to the modules with respect to the building structure.

The interconnecting strip installed in operation 1402 may be configurable such that connections between its connector terminals may be adjusted to provide different connection schemes. In this situation, process 1400 may involve two optional operations to identify a connecting scheme (in operation 1404) and to adjust switches (in operation 1406) according to this identified scheme. Operations 1404 and 1406 may be completed before or after the interconnecting strip is installed on the building structure in operation 1402. Furthermore, operations 1404 and 1406 may be completed for each individual row as reflected by a decision block 1410 and the loop in the flow chart.

Process 1400 then proceeds with installing BIPV modules in a row that overlaps with the interconnecting strip in operation 1408. One of the modules in this row may form one or more electrical connections to the interconnecting strip. More specifically, electrical connections are formed between one or more connector terminals of the strip and one or more corresponding contact points of one or two modules. The one or two modules that make connections to the interconnecting strip may be electrically connected to other modules in this row, thereby forming one or more smaller electrical loops as described above.

In certain embodiments, connector terminals of the interconnecting strip extend in a direction substantially perpendicular to its base sheet such that electrical connections with one or more contact points of the BIPV module are established while lowering this module onto the strip in operation 1408. However, other orientations of the connector terminals are possible as well. For example, a module may be slid in parallel to the interconnecting strip to establish electrical connections.

In certain embodiments, contact leads of a module may be offset with respect to connector terminals of the interconnecting strip. For example, all terminal groups of the interconnecting strip may be in line, while modules may be offset. In this situation, an extending strip may be attached between the module and interconnecting strip to provide connections between corresponding contact points and connector terminals.

If additional rows of BIPV modules need to be installed, then some operations of process 1400 may be repeated. In certain embodiments, an interconnecting strip may be extended by electrically connecting the first strip to a second strip. A combination of the two strips may allow for interconnecting more rows of BIPV modules.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. An interconnecting strip for providing electrical connections between building integrable photovoltaic modules arranged in multiple rows, the interconnecting strip comprising:
   a base sheet comprising an insulating material;
   two or more terminal groups, including a first terminal group and a second terminal group, wherein each terminal group comprises at least four connector terminals; and
   two or more connecting leads, including a first connecting lead and a second connecting lead, wherein:
      the two or more terminal groups are affixed to the base sheet,
      the first terminal group is offset from the second terminal group by a first distance,
      each of the at least four connector terminals is configurable to:
         electrically connect with one or more building integrable photovoltaic modules,
         electrically connect with one or more of the other at least four connector terminals in the same terminal group,
         electrically connect with one or more of the at least four connector terminals in a different terminal group, and
         electrically disconnect from one or more of the other at least four connector terminals in the same terminal group;
      each of the two or more connecting leads are configurable to electrically connect to two terminal connectors,
      the first connecting lead electrically connects one of the at least four connector terminals in the first terminal group to one of the at least four connector terminals in the second terminal group, and
      the second connecting lead electrically connects one of the at least four connector terminals in the first terminal group to an item selected from the group consisting of one of the at least four connectors in the second terminal group and one of the at least four connectors in another one of the two or more terminal groups.

2. The interconnecting strip of claim 1, wherein the at least four connector terminals comprise sockets extending substantially perpendicular to the base sheet.

3. The interconnecting strip of claim 1, wherein the first distance corresponds to a width of exposed portions of the building integrable photovoltaic modules.

4. The interconnecting strip of claim 1, wherein two adjacent terminal groups are offset from each other by a second distance in a direction along a width of the base sheet.

5. The interconnecting strip of claim 1, wherein:
   at least one terminal group further comprises a jumper, and
   the jumper electrically connects two of the at least four connector terminals of the same terminal group.

6. The interconnecting strip of claim 1, wherein:
   each of the two or more terminal group further comprises at least one jumper, and
   each jumper electrically connects two of the at least four connector terminals of the same terminal group.

7. The interconnecting strip of claim 1, wherein:
one or more terminal groups further comprise at least one integrated switches,
the at least one integrated switch is electrically connected to two or more of the at least four terminal connectors in the same terminal group, and
the at least one integrated switch is configured to change the electrical connections among the at least four connector terminals in the same terminal group.

8. The interconnecting strip of claim 1, wherein one or more terminal groups further comprise at least six connector terminals in the one or more terminal groups.

9. The interconnecting strip of claim 1, wherein:
one of the two or more terminal groups further comprises eight connector terminals, wherein:
two of the eight connector terminals are connected to two corresponding connector terminals in another of the two or more terminal groups; and
two other of the eight connector terminals are connected to two corresponding connector terminals in a different terminal group.

10. The interconnecting strip of claim 1, wherein
two of the at least four connector terminals of at least one of the two or more terminal groups are movable on the base sheet.

\* \* \* \* \*